(12) United States Patent
Shakushi et al.

(10) Patent No.: US 8,902,476 B2
(45) Date of Patent: Dec. 2, 2014

(54) IMAGE READING APPARATUS FOR READING A DOCUMENT ON A READING UNIT

(75) Inventors: Koji Shakushi, Hachioji (JP); Mitsuru Okuzawa, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 730 days.

(21) Appl. No.: 13/112,944

(22) Filed: May 20, 2011

(65) Prior Publication Data

US 2011/0304892 A1    Dec. 15, 2011

(30) Foreign Application Priority Data

Jun. 11, 2010  (JP) ................................. 2010-133532
Jul. 27, 2010  (JP) ................................. 2010-167876

(51) Int. Cl.
*H04N 1/04*       (2006.01)
*H04N 1/00*       (2006.01)

(52) U.S. Cl.
CPC ....... *H04N 1/00416* (2013.01); *H04N 1/00411* (2013.01); *H04N 1/00424* (2013.01); *H04N 1/0044* (2013.01); *H04N 1/00469* (2013.01); *H04N 1/00472* (2013.01); *H04N 1/00474* (2013.01); *H04N 1/00482* (2013.01); *H04N 1/00493* (2013.01); *H04N 1/00496* (2013.01); *H04N 2201/0081* (2013.01); *H04N 2201/0094* (2013.01)
USPC ....................................................... 358/474

(58) Field of Classification Search
None
See application file for complete search history.

(56) References Cited

U.S. PATENT DOCUMENTS

| | | | |
|---|---|---|---|
| 6,532,349 B1* | 3/2003 | Todome ........................ | 399/81 |
| 2007/0153320 A1* | 7/2007 | Yamaoka ..................... | 358/1.15 |
| 2010/0097313 A1* | 4/2010 | Montierth et al. ........... | 345/156 |

FOREIGN PATENT DOCUMENTS

| | | |
|---|---|---|
| JP | H09 26832 | 1/1997 |
| JP | 2003-274102 | 9/2003 |
| JP | 2004-139142 | 5/2004 |
| JP | 2004-180022 | 6/2004 |
| JP | 2007-013875 | 1/2007 |
| JP | 2010-034940 | 2/2010 |

OTHER PUBLICATIONS

Notification of Reasons for Refusal from JPO for appl. No. 2010-167876, dispatched Feb. 25, 2014, 3 pgs.
Translation of the Notification of Reasons for Refusal from JPO for appl. No. 2010-167876, dispatched Feb. 25, 2014, 5 pgs.

* cited by examiner

*Primary Examiner* — Benny Q Tieu
*Assistant Examiner* — Sunil Chacko
(74) *Attorney, Agent, or Firm* — Squire Patton Boggs (US) LLP

(57) ABSTRACT

Disclosed is an image reading apparatus which reads a document placed on a reading unit including a display input unit including a first display unit which displays information and an input unit to accept an input operation with respect to the first display unit; a document holder which sandwiches the document with the reading unit, a support which supports the document holder so as to rotate so that a facing state of the document holder with respect to the reading unit is switchable and a second display unit which includes a surface of the document holder which faces the reading unit and the second display unit carries out a display in the surface.

15 Claims, 27 Drawing Sheets

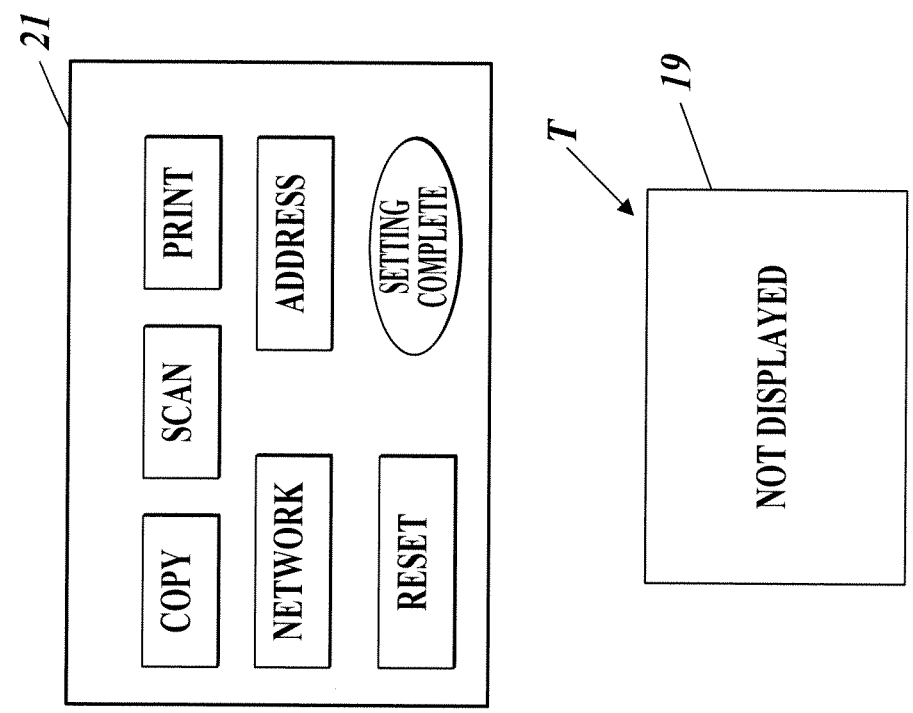
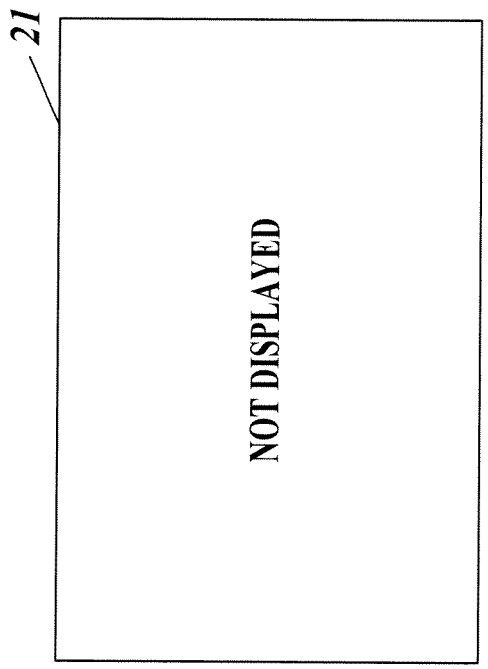
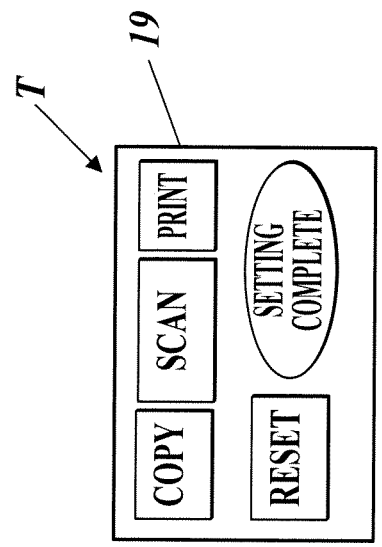

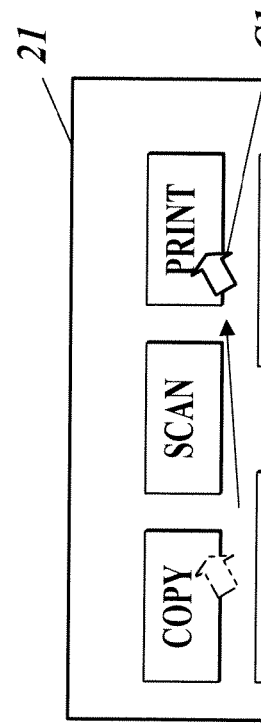
FIG.7A
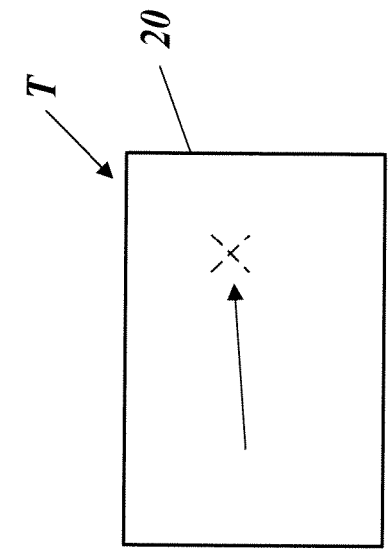
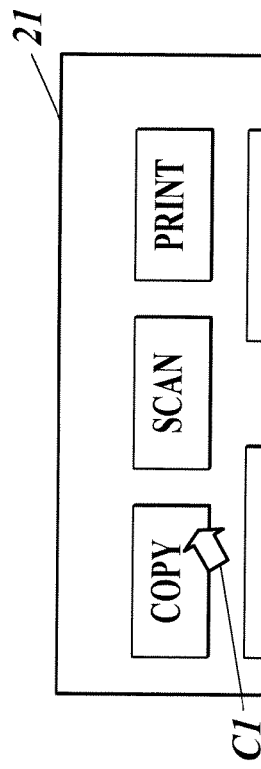
FIG.7B
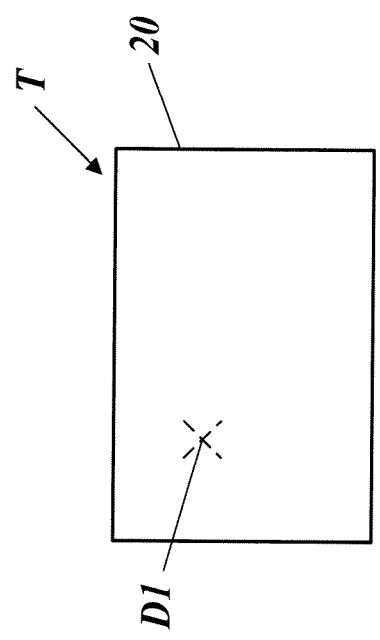

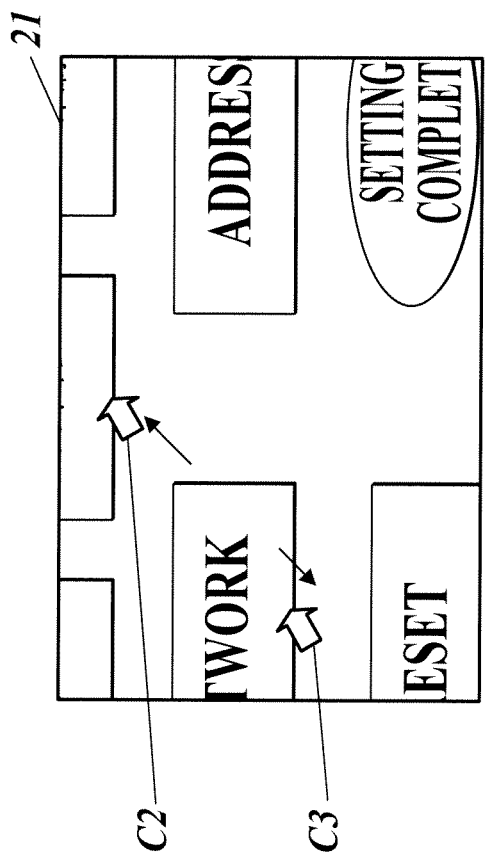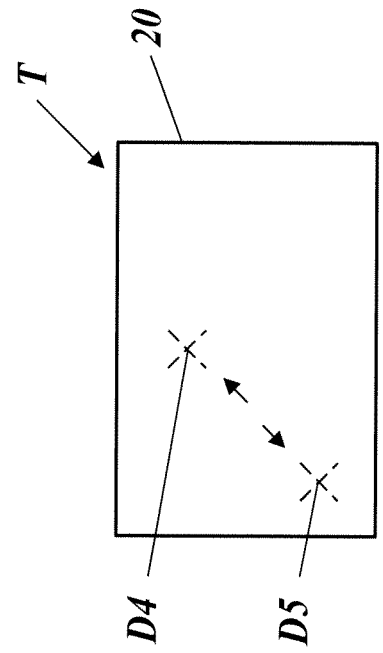
FIG.8A  FIG.8B
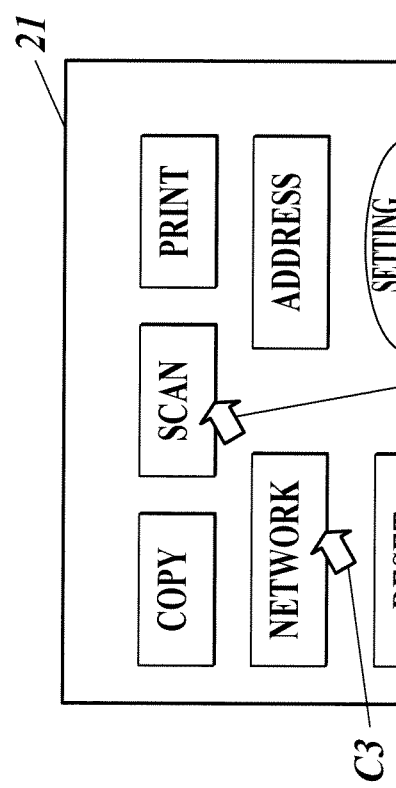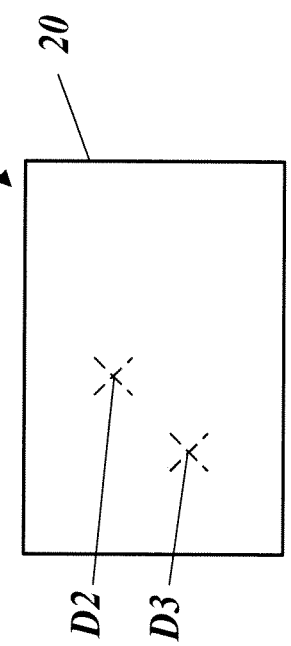

FIG.11

| SCREEN OF FIRST DISPLAY UNIT | SCREEN OF SECOND DISPLAY UNIT |
|:---:|:---:|
| 101a | 101 |
| 101b | |
| 102a | 102 |
| 103a | 103 |
| 103b | |
| 103c | |
| ⋮ | ⋮ |

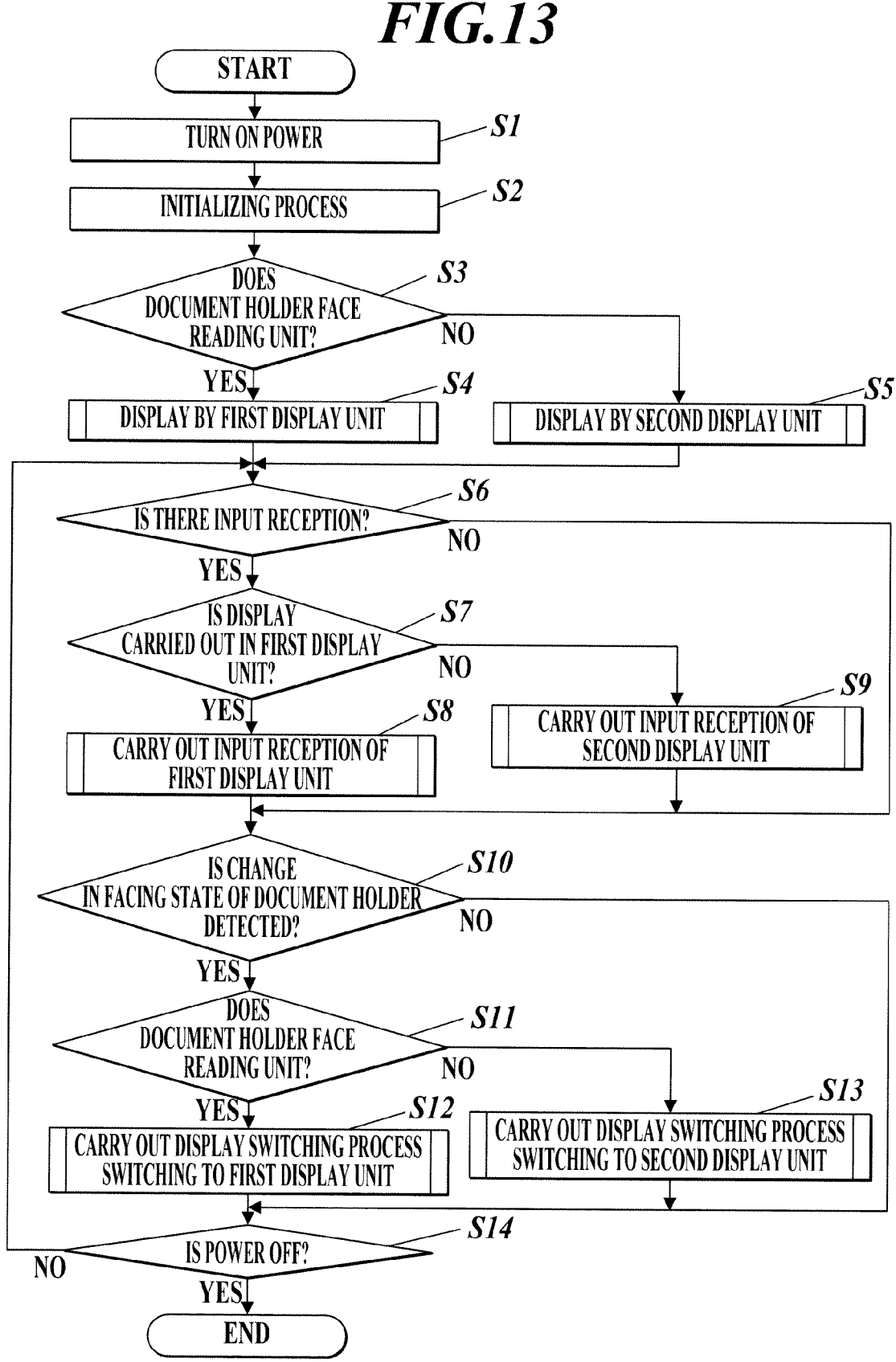

FIG.23
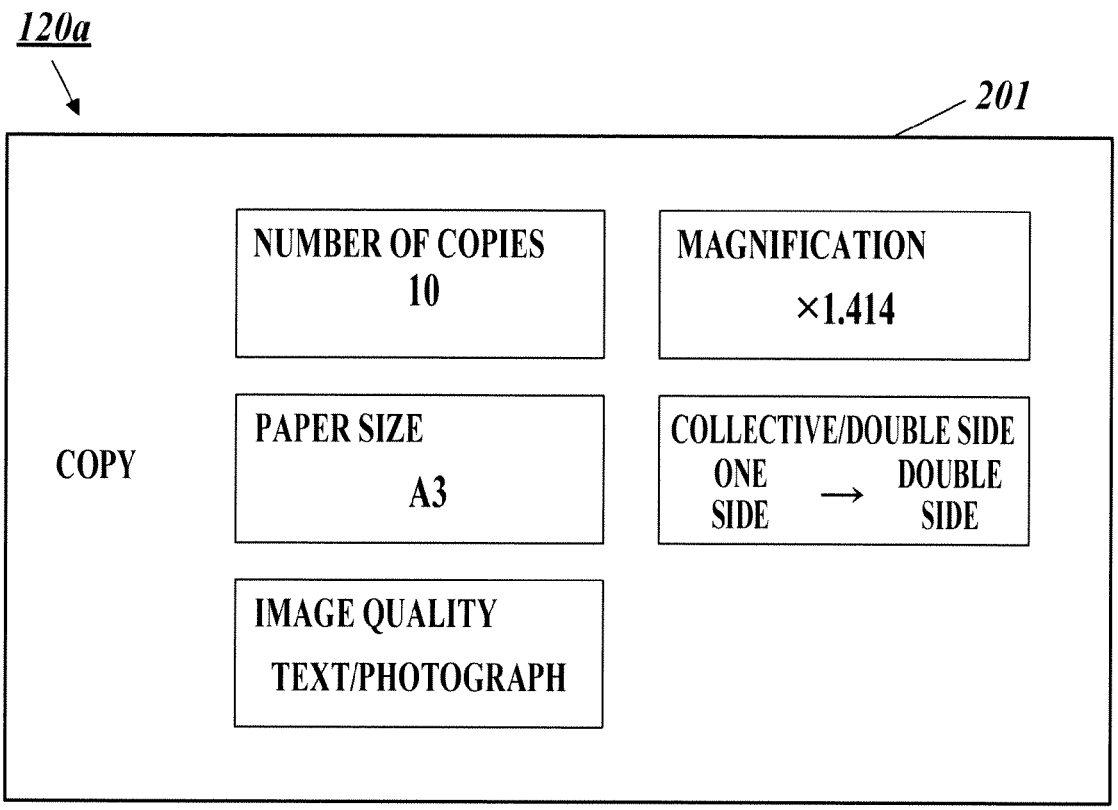
CORRESPONDENCE
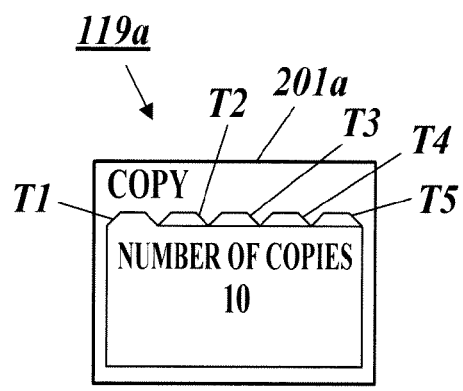

FIG.27

| SCREEN OF FIRST DISPLAY UNIT | SCREEN OF SECOND DISPLAY UNIT |
|---|---|
| 201a | 201 |
| PASSWORD SETTING SCREEN | – |
| 202a | 202 |
| 202b | |
| ⋮ | |
| ⋮ | ⋮ |

IMAGE READING APPARATUS FOR READING A DOCUMENT ON A READING UNIT

BACKGROUND OF THE INVENTION

1. Field of the Invention

The present invention relates to an image reading apparatus.

2. Description of Related Art

As for a method to carry out various types of inputs to an image reading apparatus such as an image scanner and MFP (Multifunction Peripheral), there is a method to carry out inputs from a touch panel by providing the image reading apparatus with a touch panel as shown in JP 2003-274102, for example. The touch panel is a device that includes a display unit which displays information and an input unit which accepts input operations with respect to the display unit, and the inputs can be carried out in a feeling like directly carrying out the operations to the display content of the display unit.

In recent years, functions included in an image reading apparatus have increased greatly. As for the functions included in the multi function image reading apparatus, for example, a function to output image data which is read by the image reading apparatus without involving an external device, a function to set various types of conditions such as the number of colors, resolution level and output format of image data, a function to directly connect the image reading apparatus to a computer network such as a local area network (LAN) and the like are suggested and other various types of functions are also suggested.

As the number of functions included in the image reading apparatus increases, the number of items to be inputted to the image reading apparatus also increases. On the other hand, in a case where inputs are to be carried out with respect to the image reading apparatus by the touch panel of JP 2003-274102, there is a limit in the amount of information that can be displayed in the display unit in a size that does not interfere with confirming (visually confirming) of the display content. Therefore, the amount of information and the items which can be inputted in one display content are restricted by the size of the touch panel. Therefore, when there are many setting items, the input operations need to be carried out by switching the content of the display unit many times in order to complete the inputs with respect to the image reading apparatus by the conventional touch panel. Thus, a user bound to carry out complicating operations.

By making the touch panel in larger size, the amount of information in one display content can be increased. However, when the touch panel is simply made in a larger size, the space for setting the touch panel needs to be increased, and thereby causing the image reading apparatus as a whole to be larger for making the size of the touch panel larger.

SUMMARY OF THE INVENTION

In view of the above problems, an object of the present invention is to increase the amount of information in one display content without increasing the size of the image reading apparatus so that the input operation with respect to the display content can be carried out comfortably.

In order to achieve at least one of the above objects, an image reading apparatus reflecting one aspect of the present invention which reads a document placed on a reading unit includes a display input unit including a first display unit which displays information and an input unit to accept an input operation with respect to the first display unit, a document holder which sandwiches the document with the reading unit, a support which supports the document holder so as to rotate so that a facing state of the document holder with respect to the reading unit is switchable and a second display unit which includes a surface of the document holder which faces the reading unit and the second display unit carries out a display in the surface.

Preferably, the above image reading apparatus further includes a control unit which accepts a content of an input operation with respect to the second display unit based on a content of the input operation carried out to the input unit.

In the above image reading apparatus preferably, the control unit switches between a process of accepting an operation content carried out to the input unit with respect to a display content of the first display unit and a process of accepting an operation content carried out to the input unit with respect to a display content of the second display unit based on a predetermined condition.

Preferably, the above image reading apparatus further includes a detecting unit which detects a facing state of the document holder with respect to the reading unit and a control unit which switches the second input display unit between a state of operating and a state of not-operating based on the facing state of the document holder detected by the detecting unit.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 6A is a diagram showing examples of display states of the first display unit and the second display unit when an operation content to the input unit with respect to the display content of the first display unit is accepted, in the first embodiment;

FIG. 6B is a diagram showing examples of display states of the first display unit and the second display unit when an operation content to the input unit with respect to the display content of the second display unit is accepted, in the first embodiment;

FIG. 7A is a diagram showing a display example of an arrow cursor in the first embodiment;

FIG. 7B is a diagram showing a display example in which the arrow cursor is moved to a position different from the position in FIG. 7A;

FIG. 8A is a diagram showing an example of the display content when pushing operation is carried out to two points in a touch panel, in the first embodiment;

FIG. 8B is a diagram showing an example of the display content when the two points shown in FIG. 8A are operated so as to be distanced from each other;

FIG. 11 is a diagram showing an example of content of a correspondence table in the first embodiment;

FIG. 13 is a flowchart showing an example of a flow of a process according to information display and input operation carried out in a MFP, in the first embodiment;

FIG. 23 is a diagram showing an example of corresponding relation between the display content of the first display unit and the display content of the second display unit, in the second embodiment;

FIG. 27 is a diagram showing an example of the content of the correspondence table in the second embodiment;

DESCRIPTION OF THE PREFERRED EMBODIMENTS

Hereinafter, embodiments of the present invention will be described in detail with reference to the drawings.

Figure 1:
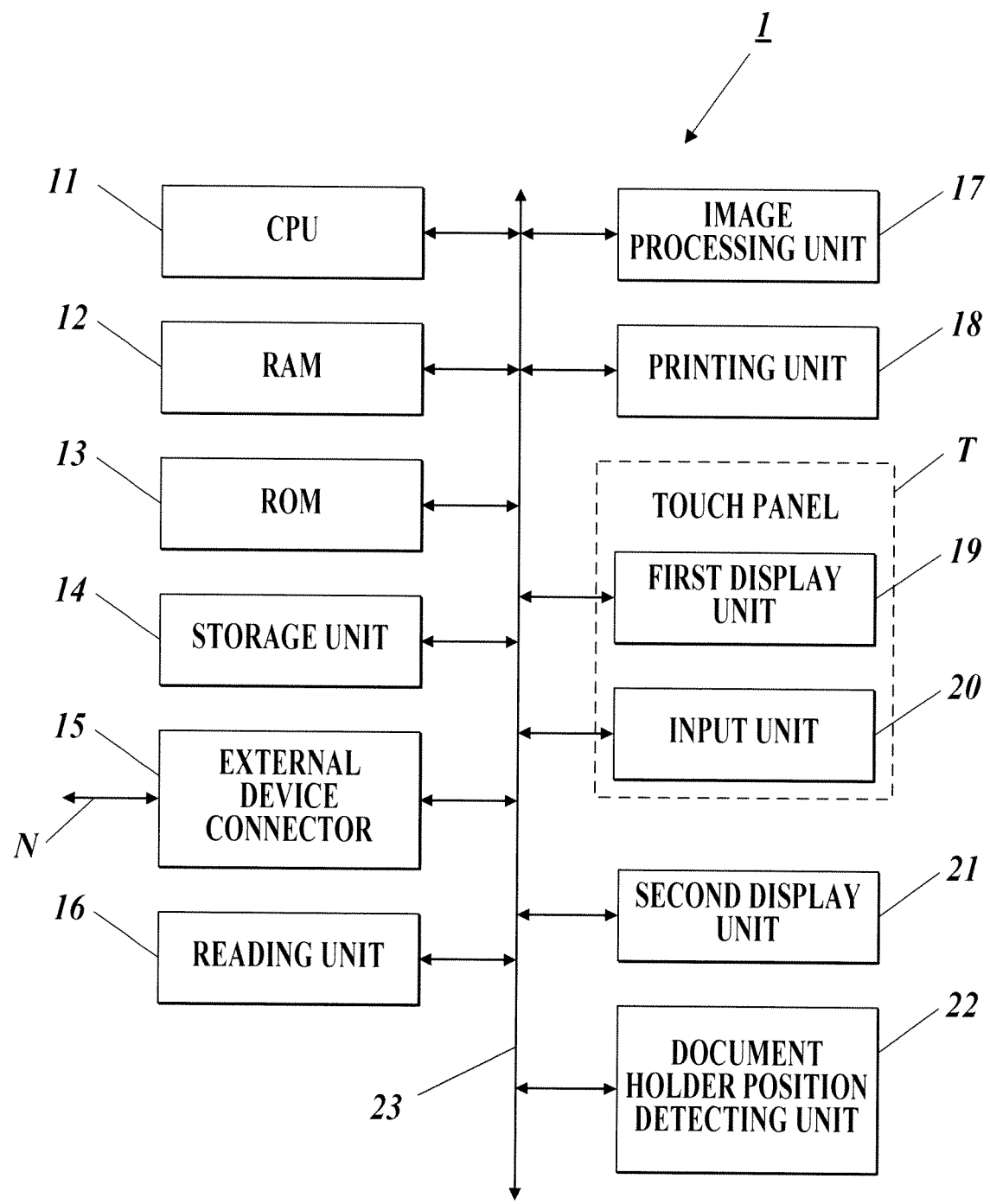
FIG. 1 is a block diagram of a MFP of the first embodiment of an image reading apparatus according to the present invention.

In FIG. 1, a block diagram of MFP 1 of the first embodiment of an image reading apparatus of the present invention is shown.

Figure 2:
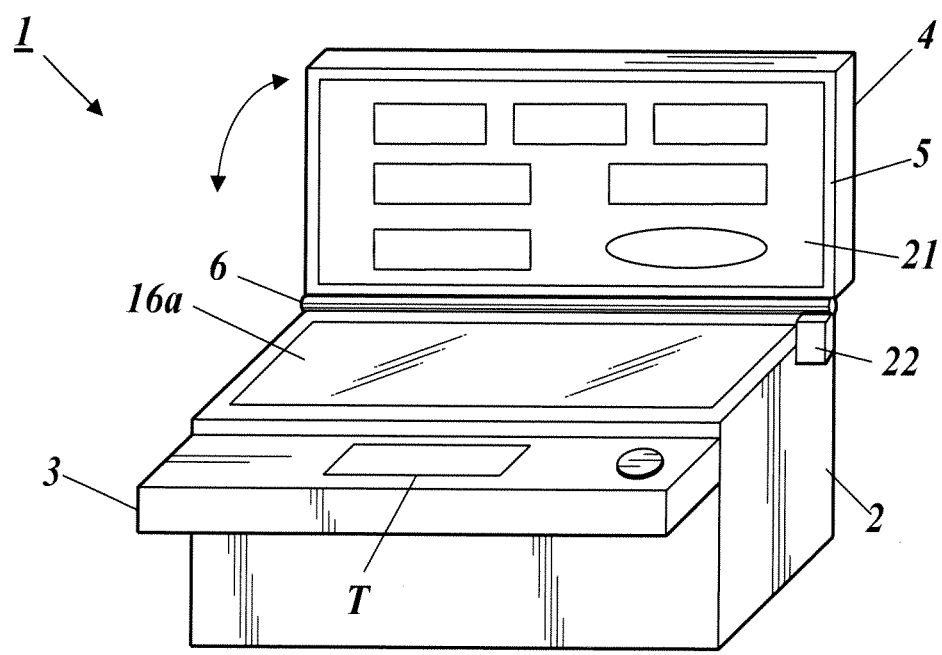
FIG. 2 is a diagram showing a schematic view of the MFP of the first embodiment.

In FIG. 2, a schematic diagram of the MFP 1 is shown. The MFP 1 includes a CPU 11, a RAM 12, a ROM 13, a storage unit 14, an external device connector 15, a reading unit 16, an image processing unit 17, a printing unit 18, a first display unit 19, an input unit 20, a second display unit 21 and a document holder position detecting unit 22, and these components are connected to each other by a bus 23.

The CPU 11 carries out an operation control of the MFP 1 according to programs, data and the like which are expanded in the RAM 21 in cooperation with programs stored in the ROM 13.

The RAM 12 stores data expanded by a process of the CPU 11, data temporarily generated by the process and such like.

The ROM 13 stores programs, data and such like read out by the CPU 11.

The storage unit 14 stores programs, data and such like readout by the CPU 11. The storage unit 14 is a storage device in which programs, data and such like are rewritable. The storage unit 14 is configured of a flash memory, a hard disk drive, other rewritable storage devices, any combinations thereof or the like, for example.

The external device connector 15 carries out data transmission with an external device. The external device connector 15 includes a communication device such as a network interface card (NIC), for example, and carries out data transmission with an external device through a circuit N. The data transmission by the external device connector 15 can be by wire or wireless, and can be of any condition (for example, standard and the like) with regard to its protocol and other connection format.

The reading unit 16 reads a document to generate image data.

For example, the reading unit 16 includes a reading surface 16a which is provided approximately horizontally as shown in FIG. 2. The reading unit 16 irradiates light to a document which is placed on the reading surface 16a from below and detects reflected light thereof. The reading unit 16 includes an image sensor such as a CCD (Charge Coupled Device) image sensor, a CMOS (Complementary Metal Oxide Semiconductor) image sensor or the like, and the reading unit 16 detects the reflected light by the image sensor and converts the reflected light into an electric signal, and then, generates image data based on the electric signal.

The image processing unit 17 carries out a predetermined image processing to the image data inputted via the external device connector 15, the image data obtained by the reading unit 16 and the like. For example, the image processing unit 17 carries out dithering to image data and inputs the image data to the printing unit 18.

The printing unit 18 carried out printing based on data inputted from the image processing unit 17.

The first display unit 19 and the input unit 20 function as structures of the touch panel T.

The touch panel T of the first embodiment is provided at an extension unit 3. The extension unit 3 is provided so as to extend from a case 2 of the MFP 1 in lateral direction, and the extension unit 3 includes the touch panel T and other various types of input devices which are not shown in the drawing.

The first display unit 19 displays various types of information according to the operation of the MFP 1.

The first display unit 19 is configured of a display device such as a crystal liquid display, an organic electro-luminescence (EL) display or the like, for example, and carries out information display under the control of the CPU 11.

Figure 3:
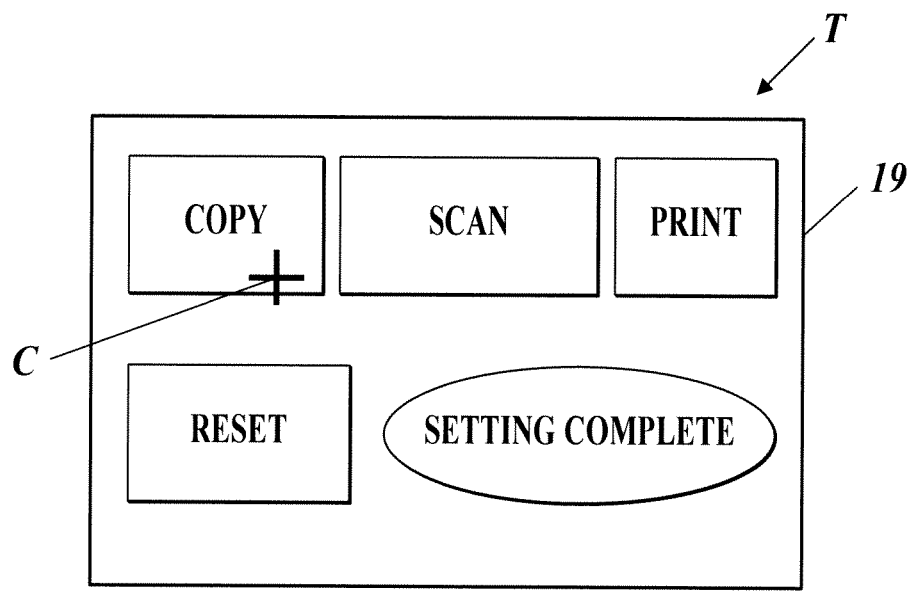
FIG. 3 is a diagram showing an example of a display content of a first display unit in the first embodiment.

In FIG. 3, an example of the display content of the first display unit 19 is shown.

Figure 4:
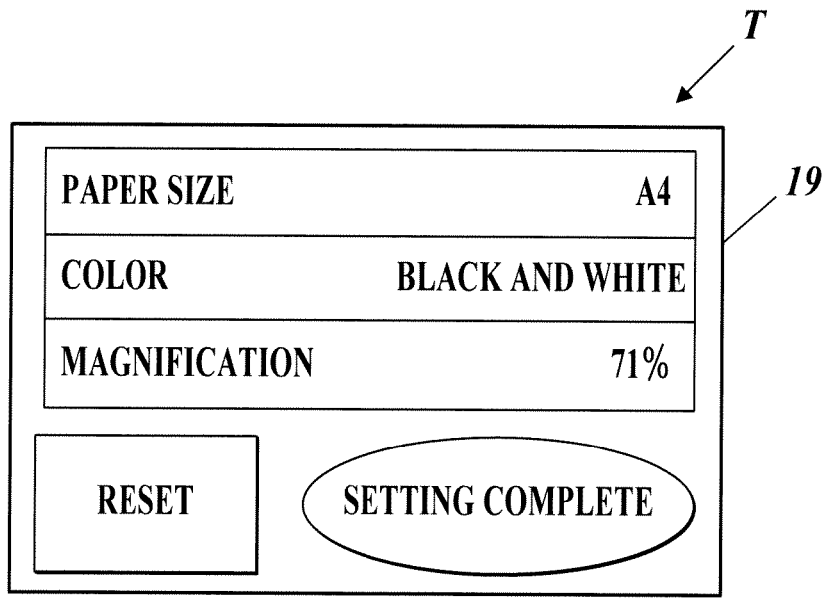
FIG. 4 is an example of the display content of the first display unit in the first embodiment, which is different from FIG. 3.

In FIG. 4, an example of the display content of the first display unit 19 which is different from FIG. 3 is shown.

In the display content showing in FIG. 3, buttons indicating items of "copy", "scan" and "print", a reset button and a setting complete button are displayed.

The input unit 20 accepts input operations with respect to the first display unit 19.

The input unit 20 includes a film type input accepting unit (not shown in the drawing) having transparency and the input accepting unit is provided so as to cover the display screen of the first display unit 19.

For example, the input accepting unit has a configuration in which two metallic thin films having transparency are provided so as to face each other, and voltage is applied to either one of the metallic thin films. When an input operation (pushing operation) with respect to the display screen of the first display unit 19 is carried out by a user, voltage occurs in the other metallic thins film according to the position where the input operation is carried out. The input unit 20 specifies the position where the input operation by a user is carried out based on the voltage occurred in the other metallic thin film.

The input unit 20 generates information (for example, coordination or the like) that indicates the position where the input operation is carried out by a user and inputs the information to the CPU 11. The CPU 11 specifies the content of the input operation carried out by a user based on the display content of the first display unit 19 and the information indicating the position where the input operation is carried out, and the CPU 11 carries out a process corresponding to the specified result.

For example, when the pushing operation of a user is carried out to the position where "copy" button shown in FIG. 3 is displayed, the input unit 20 detects the information (for example, coordination or the like) indicating the position where the pushing operation is carried out and outputs the information to the CPU 11. The CPU 11 specifies that the input operation to the "copy" button is carried out based on the display content of the first display unit 19 and the information indicating the position where the pushing operation is carried out. Then, the CPU 11 carries out a process corresponding to the specified content of the input operation. For example, when an input operation is carried out to the position corresponding to the "copy" button in the touch panel T, the CPU 11 displays an indicator (for example, the cross cursor C shown in FIG. 5) which indicates the position. Thereafter, the CPU 11 carries out the process of displaying the copying process setting screen shown in FIG. 4 in the first display unit 19 as the process corresponding to the input operation to the "copy" button.

In such way, the CPU 11 carries out the process of accepting the operation content carried out to the input unit 20 with respect to the display content of the first display unit 19.

Further, the CPU 11 carries out a display control based on the timing when the input operation is carried out. For example, the CPU 11 discriminates between a case where a pushing operation to one point is simply carried out, a case where a continuous pushing operation where pushing is continuously carried out to approximately the same point within a predetermine time period (click operation) is carried out, a case where an operation in which continuous moving of a pushing position is to be detected (slide operation) is carried out by carrying out a pushing operation to one point and move to another point while maintaining the pushing and the like, and the CPU 11 carries out a display control corresponding to each input operation.

The second display unit 21 is a display device which is provided separately from the first display unit 19, and the second display unit 21 displays various types of information according to the operation of the MFP 1. The second display unit 21 is provided at the surface 5 of the document holder 4 shown in FIG. 2. The size (area) of the display screen of the second display unit 21 is large comparing to the size (area) of the display screen of the first display unit 19.

The surface 5 of the document holder 4 is provided so as to sandwich a document (for example, a paper document and the like) between the surface 5 of the document holder 4 and the reading surface 16*a* of the reading unit 16. Further, the document holder 4 is provided so as to rotate with respect to the reading surface 16*a* by setting the support 6 as the rotation shaft thereof. By the document holder 4 changing its rotation angle with respect to the reading surface 16*a*, the facing state of the surface 5 with respect to the reading surface 16*a* switches. That is, the support 6 rotatably supports the document holder 4 so that the facing state of the surface 5 of the document holder 4 with respect to the reading surface 16*a* can be switched.

The document holder position detecting unit 22 detects the facing state of the surface 5 of the document holder 4 with respect to the reading surface 16*a* of the reading unit 16.

Figure 5A:
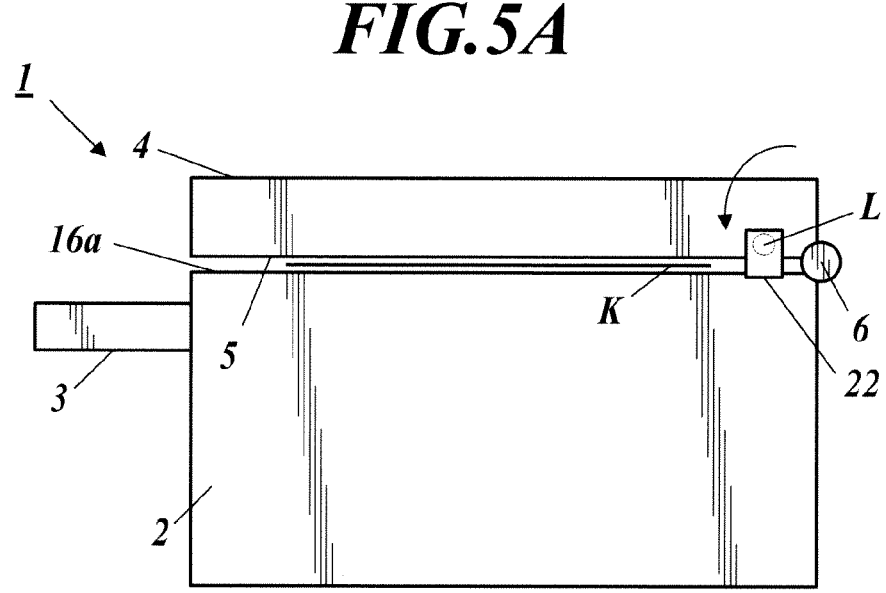
FIG. 5A is a diagram showing an example where a surface of a document holder faces a reading surface of a reading unit in the first embodiment.
Figure 5B:
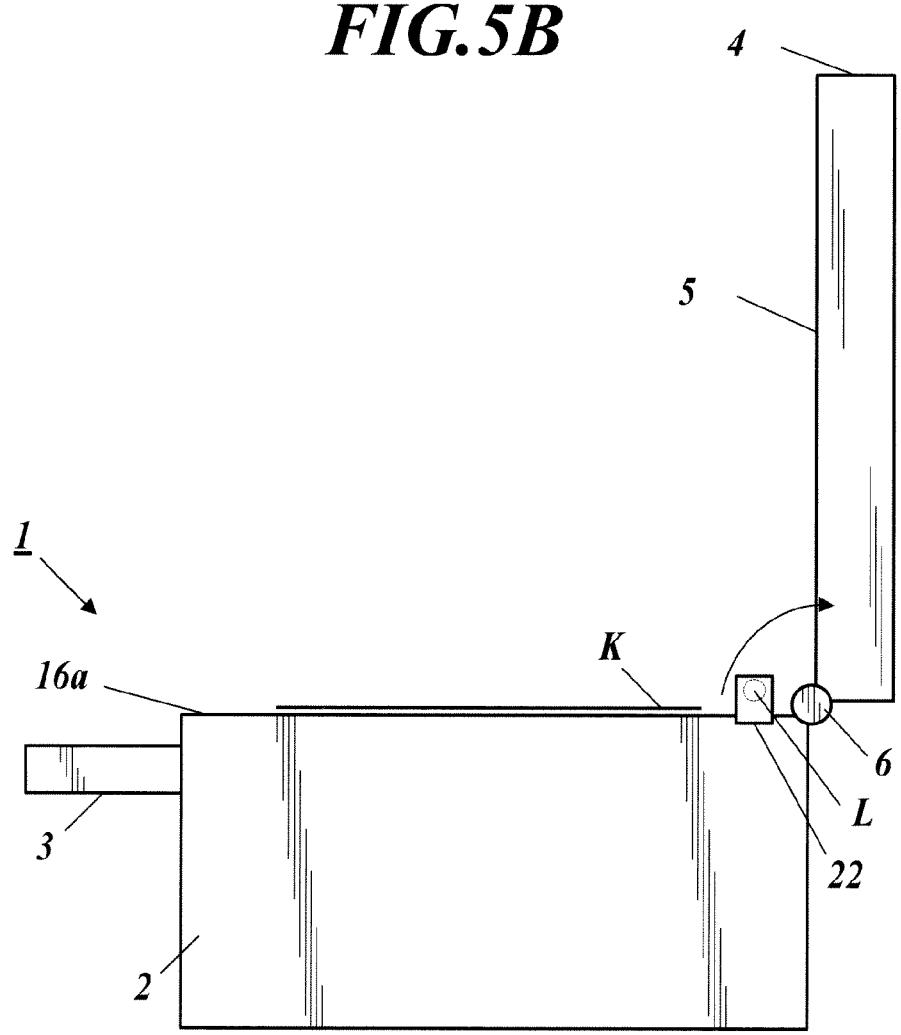
FIG. 5B is a diagram showing an example where the surface of the document holder does not face the reading surface of the reading unit in the first embodiment.

In FIGS. 5A and 5B, examples of the position detection of the document holder 4 by the document holder position detecting unit 22 are shown. FIG. 5A shows an example where the surface 5 of the document holder 4 faces the reading surface 16*a* of the reading unit 16. FIG. 5B shows an example where the surface 5 of the document holder 4 does not face the reading surface 16*a* of the reading unit 16.

The document holder position detecting unit 22 uses a light sensor L which detects whether a target object is there or not by irradiating light and detecting reflected light, for example, and the document holder position detecting unit 22 detects whether the rotation angle of the document holder 4 is the angle indicating that the surface 5 is facing the reading surface 16*a* of the reading unit 16 or not based on whether the reflected like is detected or not.

For example, as in the example shown in FIG. 5A, when the rotation angle of the document holder 4 is the rotation angle of sandwiching the document (paper medium K) which is placed on the reading surface 16*a* between the reading surface 16*a* and the surface 5, the surface 5 of the document holder 4 faces the reading surface 16*a* of the reading unit 16. At this time, the light sensor L of the document holder position detecting unit 22 detects the reflected light which is reflected by the document holder 4.

On the other hand, as in the example shown in FIG. 5B, when the rotation angle of the document holder 4 is the rotation angle that makes the space above the document (paper medium K) placed on the reading surface 16a of the reading unit 16 be opened, the surface 5 of the document holder 4 does not face the reading surface 16a of the reading unit 16. At this time, the light sensor L of the document holder position detecting unit 22 does not detect the reflected light which is reflected by the document holder 4.

The CPU 11 obtains the facing state of the document holder 4 which is detected by the document holder position detecting unit 22 and switches the display unit (the first display unit 19 or the second display unit 21) which corresponds to the operation content of the input unit 20.

In particular, the CPU 11 carries out the process to accept the operation content carried out to the input unit 20 with respect to the display content of the first display unit 19 when the document holder 4 faces the reading unit 16, and the CPU 11 accepts the operation content carried out to the input unit 20 with respect to the display content of the second display unit 21 when the document holder 4 does not face the reading unit 16.

By using FIGS. 6A and 6B, the switching of the display unit which corresponds to the operation content carried out to the input unit 20 will be described. FIG. 6A shown an example of display states of the first display unit 19 and the second display unit 21 when accepting the operation content carried out to the input 20 with respect to the display content of the first display unit 19. FIG. 6B shows an example of display states of the first display unit 19 and the second display unit 21 when accepting the operation content carried out to the input unit 20 with respect to the display content of the second display unit 21. The appearing size of the touch panel T and the appearing size of the second display unit 21 shown in FIG. 6 and in the drawings thereafter are schematically shown, and these sizes do not limit the ration of the sizes of the actual touch panel T and the second display unit 21 in any way.

For example, when the document holder 4 faces the reading unit 16, the second display unit 21 which is provided at the surface 5 of the document holder 4 is in the position of facing the reading surface 16a of the reading unit 16 as shown in FIG. 5A. Therefore, the display screen of the second display unit 21 has the a rotation angle that the display screen cannot be seen or very difficult to be seen by a user. Thus, as shown in FIG. 6A, the CPU 11 does not carry out display in the second display unit 21 and carries out the process of accepting the operation content carried out to the input unit 20 with respect to the display content of the first display unit 19.

On the other hand, for example, when the document holder 4 does not face the reading unit 16, the display screen of the second display unit 21 has the rotation angle that a user can see the display surface of the second display unit 21 easily as shown in FIG. 5B. In such case, the CPU 11 makes the second display unit 21 carryout display and carries out the operation of accepting the operation content carried out to the input unit 20 with respect to the display content of the second display unit 21 as shown in FIG. 6B. Further, when the CPU 11 carries out the process of accepting the operation content carried out to the input unit 20 with respect to the display content of the second display unit 21, the CPU 11 does not carry out display in the first display unit 19 of the touch panel T and accepts the content of the input operation carried out to the input unit 20 as the content of the input operation with respect to the display content of the second display unit 21.

By using FIGS. 7A and 7B, an example when the operation content carried out to the input unit 20 with respect to the display content of the second display unit 21 is accepted will be shown. FIG. 7A shows a display example of the arrow cursor C1. FIG. 7B shows a display example when the arrow cursor C1 is moved to a position different from the position in FIG. 7A.

When the operation content carried out to the input unit 20 with respect to the display content of the second display unit 21 is to be accepted, the CPU 11 displays an indicator (for example, the arrow cursor C1 shown in FIG. 7) in the second display unit 21. Further, the CPU 11 makes the position where the input operation is carried out by a user to the input accepting unit of the input unit 20 and a position in the display screen of the second display unit 21 correspond to each other. Then, the CPU 11 moves the indicator according to the input operation carried out by a use to the input accepting unit of the input unit 20.

For example, the display position of the arrow cursor C1 shown in FIG. 7A corresponds to the position D1 where the pushing operation is carried out in the touch panel T. Further, for example, the CPU 11 moves the cursor according to the content of the input operation carried out by a user to the touch panel T as shown in FIG. 7B.

Moreover, when carrying out the process of accepting the operation content carried out to the input unit 20 with respect to the display content of the second display unit 21, the CPU 11 accepts the input operation carried out to two points in the input accepting unit.

For example, the CPU 11 carries out enlarging or shrinking of the display content of the second display unit 21 according to the content of the input operation carried out to the two points in the input accepting unit.

By using FIGS. 8A and 8B, an example of when enlarging the display content of the second display unit 21 will be shown. FIG. 8A shows an example of the display content when pushing operations are carried out to two points D2 and D3 in the touch panel T. FIG. 8B shows an example of the display content when an operation is carried out so as to distance the two points D2 and D3 shown in FIG. 8A from each other.

For example, as shown in FIG. 8A, when pushing operation is carried out to the two points D2 and D3 in the touch panel T, the CPU 11 displays the arrow cursors C2 and C3 respectively corresponding to the two points D2 and D3. When an input operation to distance the two points D2 and D3 from each other is carried out in the state shown in FIG. 8A to be in the state shown in FIG. 8B, the CPU 11 enlarges the display content of the second display unit 21 according to the distance between the two points D2 and D3. In particular, the CPU 11 carries out a display control so as to match the positions of the arrow cursors C2 and C3 with respect to the display screen of the second display unit 21 to the positions of the two points D4 and D5 after the separation operation, respectively, without changing the display content of the second display unit 21 and the positional relation between the arrow cursors C2 and C3.

Further, when an input operation to make the two points in the touch panel T approach each other is carried out, the CPU 11 shrinks the display content of the second display unit 21 according to the degree of closeness of the two points after the input operation.

In the first embodiment, positions of the two points at the time when the distancing operation is completed or when the approaching operation is completed are accepted by the click operation. After a user pushing the positions on the touch panel T corresponding to the two points before the distancing or the approaching, a user carries out the slide operation to the two points so as to move to the positions of the two points after the distancing operation is completed or the approaching operation is completed, and thereafter, by carrying out the click operation at the positions of the two points after the distancing operation is completed or the approaching operation is completed, the input operation of enlarging or shrinking of the display content can be carried out.

Further, the CPU 11 moves the display content of the second display unit 21 with respect to the display area of the second display unit 21 according to the content of the input operation carried out to the two points in the input accepting unit.

Figure 9:
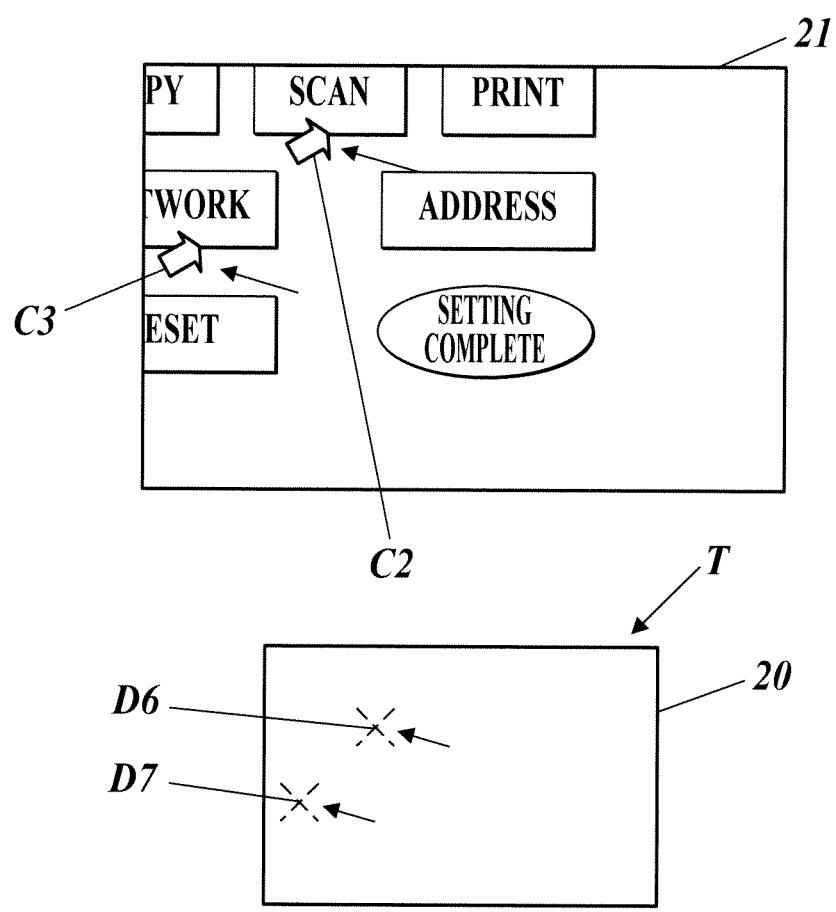
FIG. 9 is a diagram showing an example of moving of the display content of the second display unit, in the first embodiment.

By using FIG. 9, an example of moving of the display content of the second display unit 21 will be shown.

For example, pushing operation is carried out to the two points D2 and D3 in the touch panel T as shown in FIG. 8A and when input operation (for example, slide operation or the like) to move the two points D2 and D3 in same direction as shown in FIG. 9 is carried out, the CPU 11 moves the display content of the second display unit 21 with respect to the display area of the second display unit 21 according to the moving direction and the moving distance of the two points D2 and D3. In particular, the CPU 11 carries out a display control so as to match the positions of the arrow cursors C2 and C3 with respect to the display area of the second display unit 21 (for example, the frame E of the second display unit 21 shown in FIG. 9) to the positions of the two points D6 and D7 after the moving operation without changing the display content of the second display unit 21 and the positional relation between the arrow cursors C2 and C3.

Furthermore, the CPU 11 displays more information in the second display unit 21 comparing to the first display unit 19.

Figure 10:
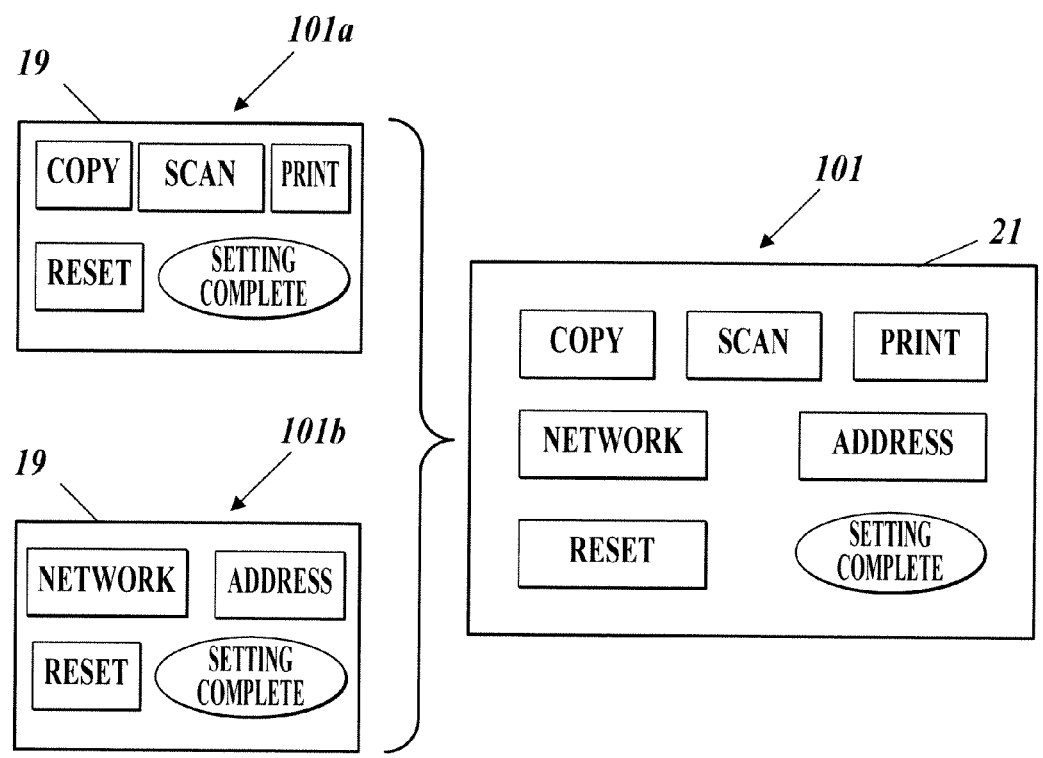
FIG. 10 is a diagram showing an example of a comparison between the display contents of the first display unit and the display content of the second display unit wherein the same amount of information is displayed, in the first embodiment.

In FIG. 10, an example of comparison between the display content of the first display unit 19 and the display content of the second display unit 21 in which same amount of information is displayed is shown.

The size (area) of the display screen of the second display unit 21 is large comparing to the size (area) of the display screen of the first display unit 19. Therefore, when the appearing size of the display content is made to be same, the second display unit 21 can include more information in the display content comparing to the first display unit 19. Thereby, when carrying out a display based on a predetermined appearing size by which the display content can be preferably identified, the second display unit 21 can include more information in the display content comparing to the first display unit 19. Therefore, the CPU 11 makes the second display unit 21 display more information comparing to the first display unit 19. For example, as shown in FIG. 10, the CPU 11 makes the second display unit 21 display the contents which are displayed in two different display contents (screen 101a and 101b) in the first display unit 19 in one display content (screen 101).

As described above, the CPU 11 obtains the position of the document holder detected by the document holder position detecting unit 22 and switches the display unit (the first display unit 19 or the second display unit 21) which corresponds to the operation content carried out to the input unit 20. In a case where the display unit switches due to a change in the position of the document holder 4 detected by the document holder position detecting unit 22, the CPU 11 decides the display content of the display unit of after the switching based on the correspondence condition which is set in advance.

When the display unit which corresponds with the operation content carried out to the input unit 20 is to be switched to the second display unit 21 from the first display unit 19, the CPU 11 decides the display content of the second display unit 21 based on the display content of the first display unit 19 of before the switching and the correspondence table.

In FIG. 11, an example of the content of the correspondence table is shown.

In the correspondence table, the display content of the first display unit 19 and the display content of the second display unit are made to correspond to each other. For example, both of the screen 101a and the screen 101b of the first display unit 19 shown in FIG. 10 correspond to the screen 101 of the second display unit 21 in the correspondence table.

The correspondence table is stored in the storage unit 14 and is read out by the CPU 11.

When the display unit which corresponds with the operation content carried out to the input unit 20 is to be switched to the second display unit 21 from the first display unit 19, first, the CPU 11 obtains the display content of the first display unit 19 of before the switching and the correspondence table. Next, the CPU 11 specifies the display content of the second display unit 21 which corresponds to the obtained display content of the first display unit 19 according to the correspondence table. Then, the CPU 11 displays the specified display content of the second display unit 21 in the second display unit 21 and does not carry out display in the first display unit 19.

Further, when the display unit which corresponds with the operation content carried out to the input unit 20 is to be switched to the first display unit 19 from the second display unit 21, the CPU 11 decides the display content of the first display unit 19 based on the position of the indicator in the display content of the second display unit 21 of before the switching.

Figure 12A:
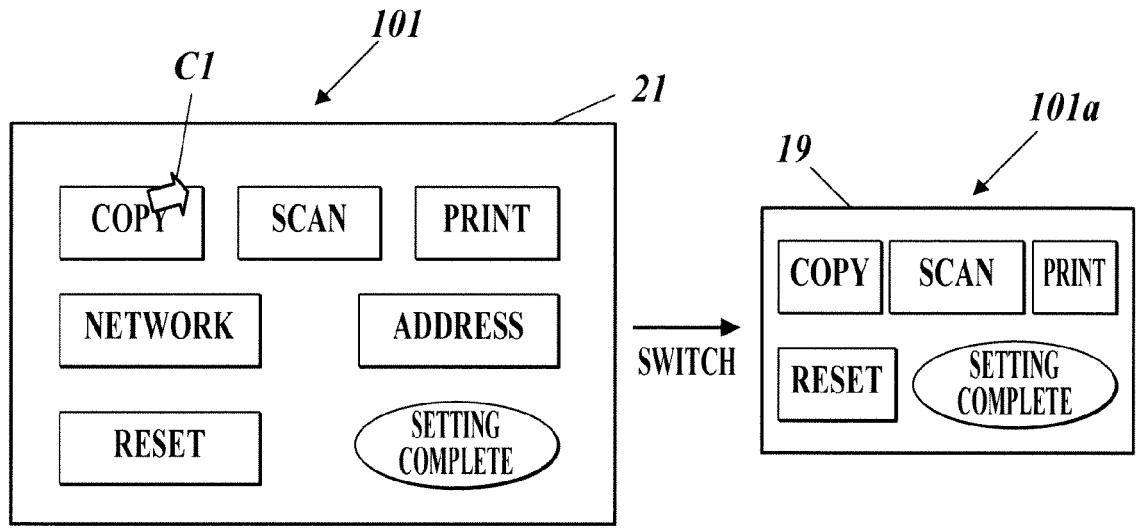
FIG. 12A is a diagram showing an example of a position of the arrow cursor in the second display unit of before the switching and the display content of the first display unit of after the switching, in the first embodiment.
Figure 12B:
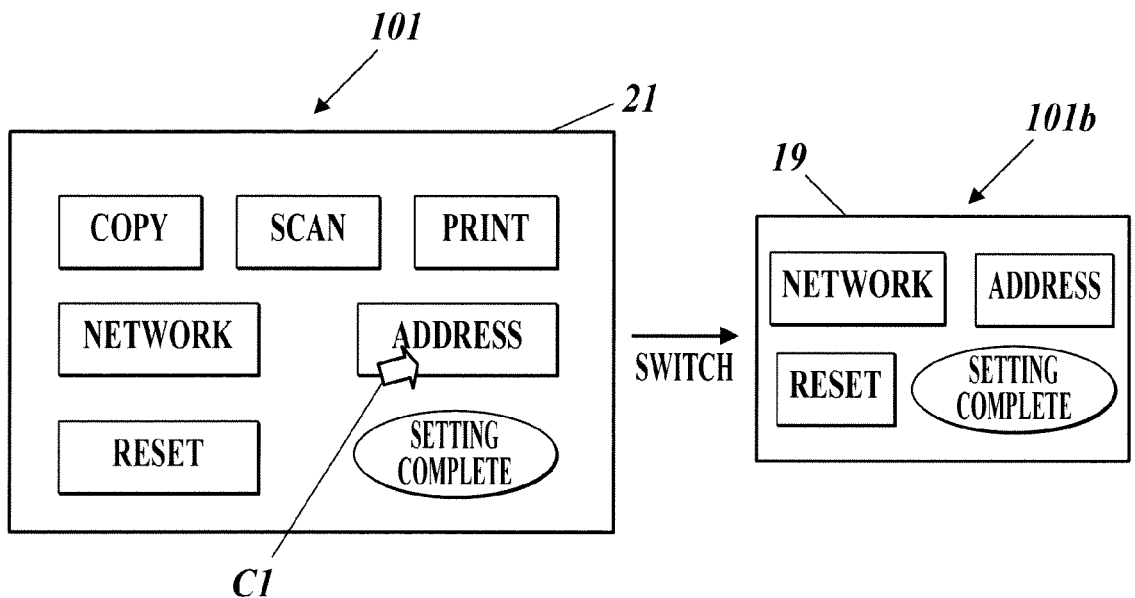
FIG. 12B is a diagram showing another example of the position of the arrow cursor in the second display unit of before the switching and the display content of the first display unit of after the switching.

By using FIGS. 12A and 12B, an example of when switching the display unit which corresponds with the operation content carried out to the input unit 20 to the first display unit 19 from the second display unit 21 is shown. FIG. 12A shows an example of the position of the arrow cursor C1 in the second display unit 21 of before the switching and the display content of the first display unit 19 of after the switching. FIG. 12B shows another example of the position of the arrow cursor C1 in the second display unit 21 of before the switching and the display content of the first display unit 19 of after the switching.

For example, when the arrow cursor C1 is at the position in the screen 101 of the second display unit 21 that corresponds to an item included in the screen 101a of the first display unit 19 as shown in FIG. 12A, the CPU 11 decides the display content of the first display unit 19 of after the switching to be the screen 101a. Furthermore, when the arrow cursor C1 is at the position in the screen 101 of the second display unit 21 that corresponds to an item included in the screen 101b of the first display unit 19 as shown in FIG. 12B, the CPU 11 decides the display content of the first display unit 19 of after the switching to be the screen 101b.

When the display unit which corresponds with the operation content carried out to the input unit 20 is to be switched to the first display unit 19 from the second display unit 21, first, the CPU 11 obtains the display content of the second display unit 21 of before the switching and the position of the indicator. Next, the CPU 11 specifies the display content of the first display unit 19 that corresponds to the position of the indicator in the obtained display content of the second display unit 21. Then, the CPU 11 displays the specified display content of the first display unit 19 in the first display unit 19 and does not carry out display in the second display unit 21.

The correspondence between the display content of the second display unit 21 and the position of the indicator thereof and the display content of the first display unit 19 can be set in advance. For example, methods such as storing information on correspondence between the combinations of screens displayed in the second display unit 21 of before the switching and ranges of positions (for example, coordination and the like) of the indicator in a screen and the screen to be displayed in the first display unit 19 of after the switching in a table format or the like is suggested. Such correspondence information in a table format can be integrally managed with the correspondence table shown in FIG. 11.

Hereinafter, a flow of a process according to information display and input operation in the MFP 1 will be described by using the flowchart of FIGS. 13 to 19.

When the power of the MFP 1 is turned on (step S1), the CPU 11 carries out the initializing process of each of the units in the MFP 1 (step S2).

After the process of step S2, the CPU 11 obtains the position of the document holder 4 which is detected by the document holder position detecting unit 22 and checks whether the document holder 4 faces the reading unit 16 or not based on the rotation angle of the document holder 4 with respect to the reading unit 16 (step S3). When the document holder 4 faces the reading unit 16 (step S3: YES), the CPU 11 carries out display in the first display unit 19 (step S4). On the other hand, when the document holder 4 does not face the reading unit 16 (step S3: NO), the CPU 11 carries out display in the second display unit 21 (step S5).

After the processes of steps S4 and S5, the CPU 11 checks whether an input in accepted by the input unit 20 or not (step S6). When an input is accepted by the input unit 20 (step S6: YES), the CPU 11 checks which display unit is carrying out the display. In the first embodiment, the CPU 11 checks whether display is carried out in the first display unit 19 or not (step S7). When display is carried out in the first display unit 19 (step S7: YES), the CPU 11 carries out the input accepting process with respect to the first display unit 19 (step S8).

On the other hand, when display is not carried out in the first display unit 19 in the checking process of step S7 (step S7: NO), that is, when display is carried out in the second display unit 21, the CPU 11 carries out the input accepting process with respect to the second display unit 21 (step S9).

After the process of step S8 or step S9 or when an input is not accepted by the input unit 20 in the checking process of step S6 (step S6: NO), the CPU 11 checks whether a change in facing state of the document holder 4 is detected by the document holder position detecting unit 22 or not (step S10). When a change in facing state of the document holder 4 is detected (step S10: YES), the CPU 11 checks whether the document holder 4 faces the reading unit 16 or not after the facing state of the document holder 4 is changed (step S11). When the document holder 4 faces the reading unit 16 after the rotation angle of the document holder 4 is changed (step S11: YES), the display switching process of switching to display in the first display unit 19 is carried out (step S12). On the other hand, when the document holder 4 does not face the reading unit 16 in the checking process of step S11 (step S11: NO), the CPU 11 carries out the display switching process of switching to display in the second display unit 21 (step S13).

After the process of step S12 or step S13 or when a change in facing state of the document holder 4 is not detected in the checking process of step S10 (step S10: NO) and when the power of the MFP 1 is not turned off (step S14: NO), the CPU 11 returns to the process of step S6 (step S14: NO). When the power of the MFP 1 is turned off (step S14: YES), the CPU 11 ends the process.

Figure 14:
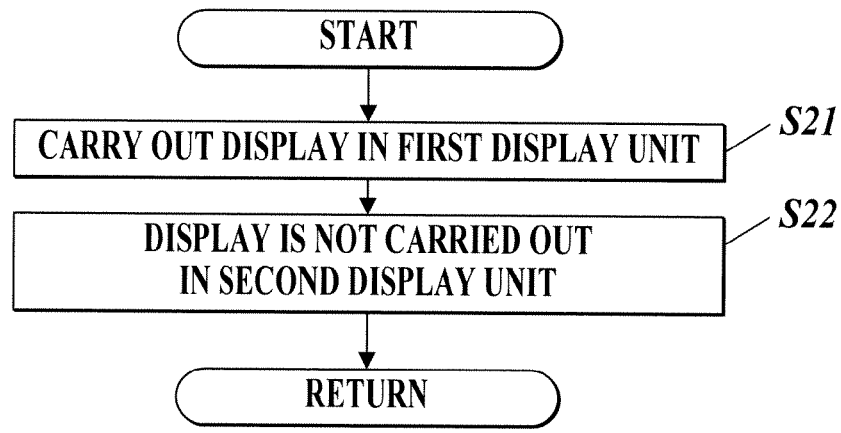
FIG. 14 is a flowchart showing an example of a flow of a display process by the first display unit, in the first embodiment.

The display by the first display unit 19 which is shown in step S4 will be described by using FIG. 14.

The CPU 11 carries out display in the first display unit 19 (step S21) and does not carry out display in the second display unit 21 (step S22).

Figure 15:
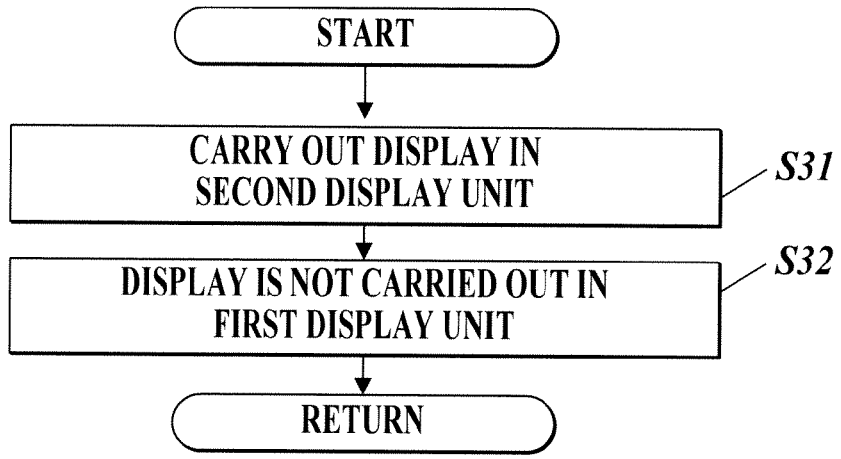
FIG. 15 is a flowchart showing an example of a flow of a display process by the second display unit, in the first embodiment.

The display by the second display unit 21 which is shown in step S5 will be described by using FIG. 15.

The CPU 11 carries out display in the second display unit 21 (step S31) and does not carry out display in the first display unit 19 (step S32).

Figure 16:
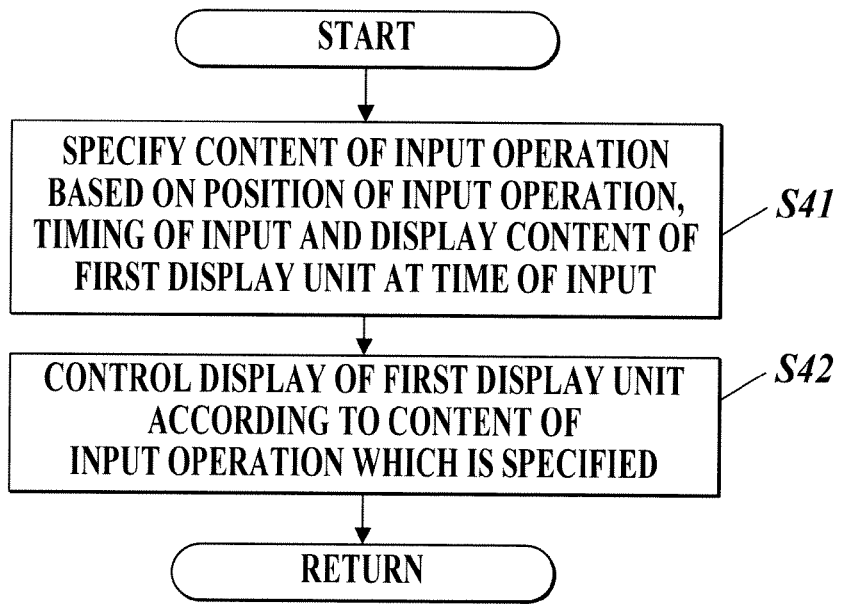
FIG. 16 is a flowchart showing an example of a flow of an input accepting process with respect to the first display unit, in the first embodiment.

The input accepting process with respect to the first display unit 19 which is shown in step S8 will be described by using FIG. 16.

The CPU 11 specifies the content of the input operation based on the information (for example, coordination) that indicates the position where the input operation which is inputted from the input unit 20 is carried out and the display content being displayed in the first display unit 19 at the input timing of the information or at the time of input operation (step S41). Then, the CPU 11 carries out a display control of the first display unit 19 according to the content of the input operation which is specified by the process of step S41 (step S42).

Figure 17:
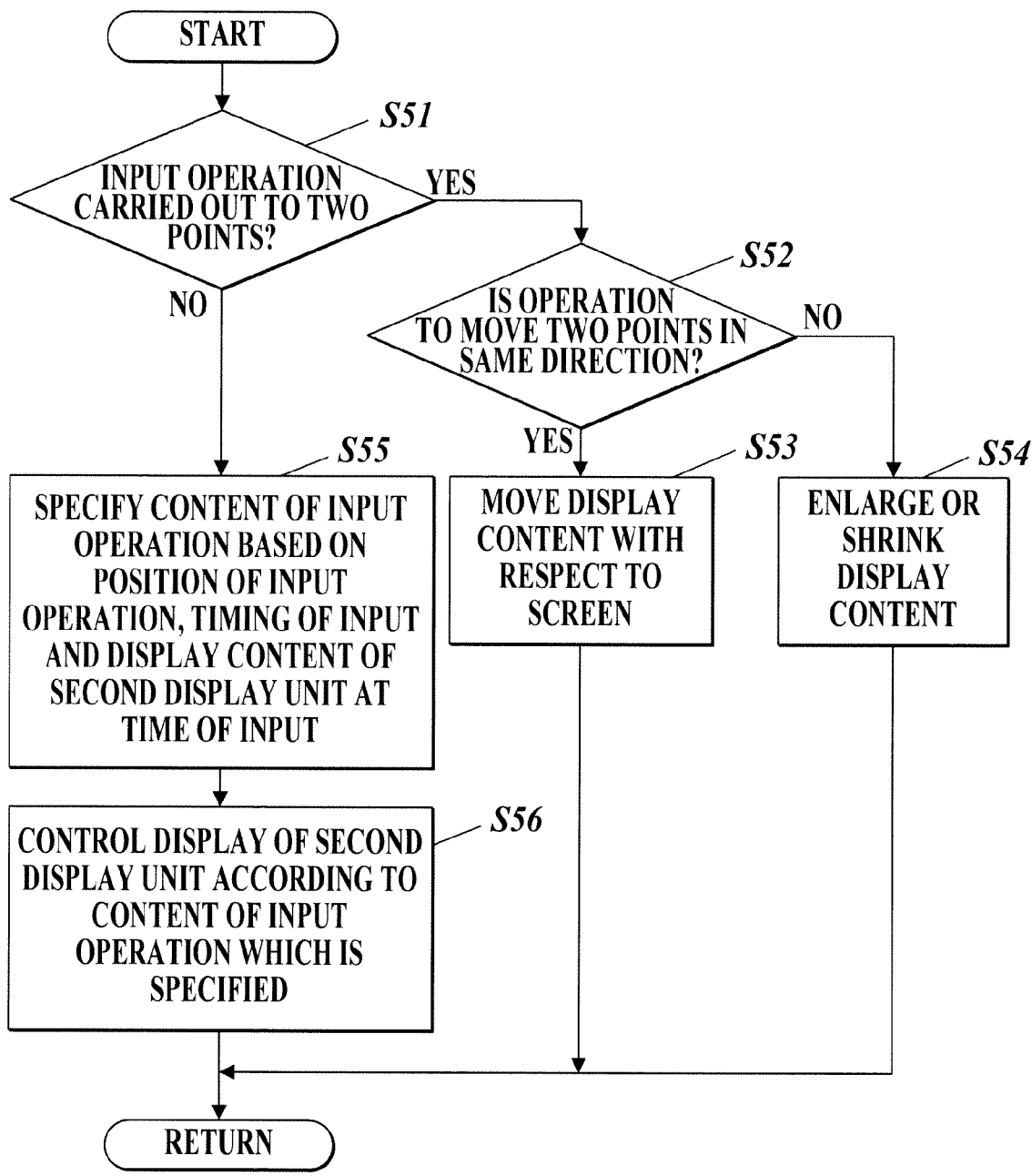
FIG. 17 is a flowchart showing an example of a flow of the input accepting process with respect to the second display unit, in the first embodiment.

The input accepting process with respect to the second display unit 21 which is shown in step S9 will be described by using FIG. 17.

The CPU 11 checks whether the input operation to the touch panel T is carried out for two points or not based on the information (for example, coordination) that indicates the position where the input operation which is inputted from the input unit 20 is carried out (step S51).

When the input operation to the touch panel T is carried out to two points (step S51: YES), the CPU 11 checks whether the input operation to the two points is an operation to move the two points in same direction or not (step S52). When the input operation to the two points is the operation to move the two points in same direction (step S52: YES), the CPU 11 moves the display content of the second display unit 21 with respect to the display area of the second display unit 21 according to the moving direction and moving distance of the two points (step S53). On the other hand, when the input operation to the two points is not the operation of moving the two points in same direction (step S52: NO) in the checking process of step S52, that is, when the operation is to make the two points be distanced from each other or to make the two points approach each other, the CPU 11 enlarges or shrinks the display content of the second display unit 21 according to the distancing or approaching of the two points (step S54).

When the input operation to the touch panel T is not carried out to the two points (step S51: NO) in the checking process of step S51, that is, when the input operation to the touch panel T is carried out to one point, the CPU 11 specifies the content of the input operation based on the information (for example, coordinate) that indicates the position where the input operation which is inputted from the input unit 20 is carried out and the display content of the second display unit 21 being displayed at the input timing of the information or at the time of input operation (step S55). Then, the CPU 11 carries out a display control of the second display unit 21 according to the content of the input operation specified by the process of step S55 (step S56).

Figure 18:
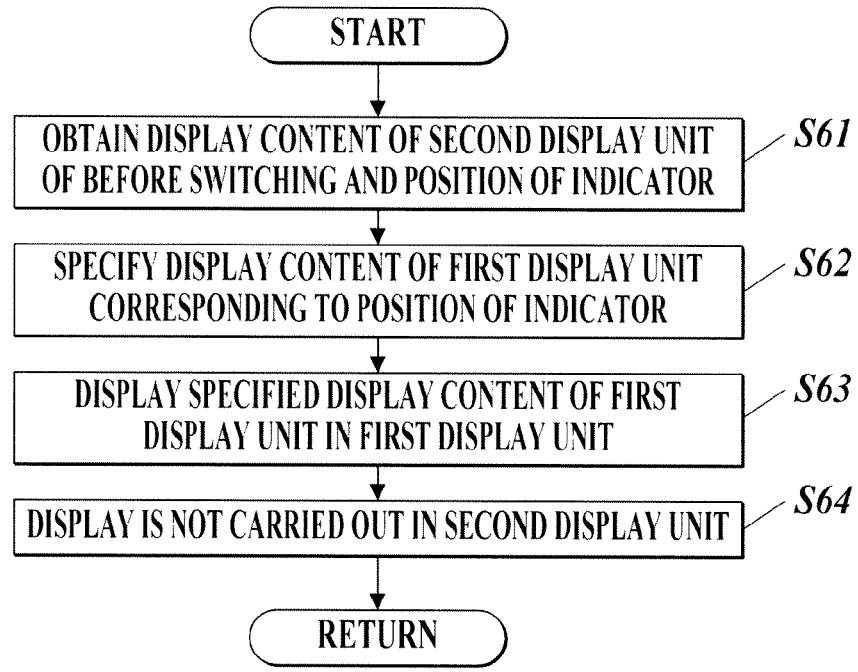
FIG. 18 is a flowchart showing an example of a flow of a display switching process of switching to the first display unit, in the first embodiment.

The display switching process of switching to display in the first display unit 19 which is shown in step S12 will be described by using FIG. 18.

First, the CPU 11 obtains the display content of the second display unit 21 of before the switching and the position of the indicator (step S61). Next, the CPU 11 specifies the display content of the first display unit 19 corresponding to the position of the indicator in the obtained display content of the second display unit 21 (step S62). Then, the CPU 11 displays the specified display content of the first display unit 19 in the first display unit 19 (step S63) and does not carry out display in the second display unit 21 (step S64).

Figure 19:
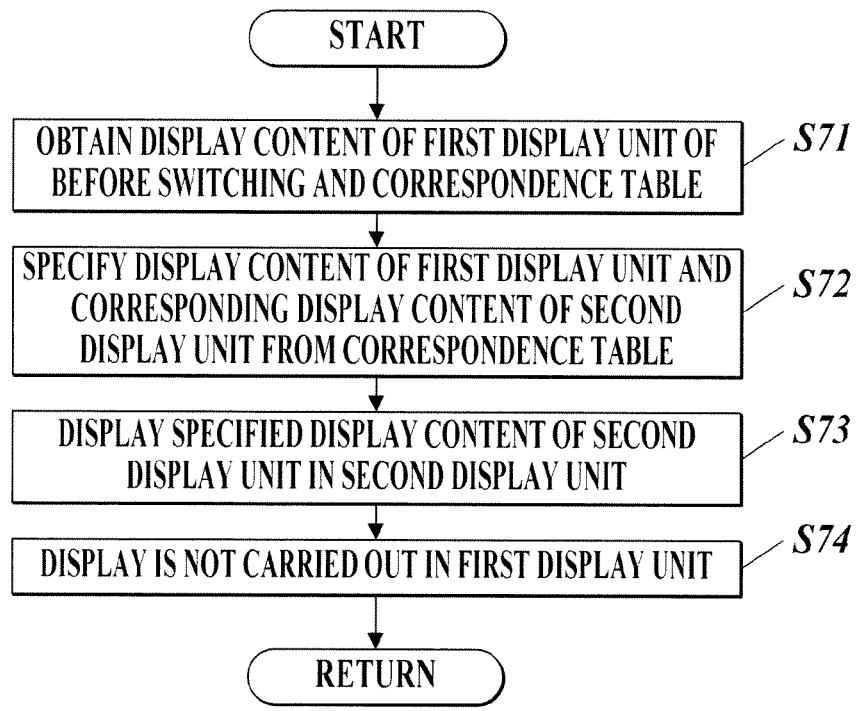
FIG. 19 is a flowchart showing an example of a flow of the display switching process of switching to the second display unit, in the first embodiment.

The display switching process switching to display in the second display unit 21 which is shown in step S13 will be described by using FIG. 19.

First, the CPU 11 obtains the display content of the first display unit 19 of before the switching and the correspondence table (step S71). Next, the CPU 11 specifies the display content of the second display unit 21 corresponding to the obtained display content of the first display unit 19 using the correspondence table (step S72). Then, the CPU 11 displays the specified display content of the second display unit 21 in the second display unit 21 (step S73) and does not carry out display in the first display unit 19 (step S74).

As described above, the MFP 1 of the first embodiment includes a touch panel T having the first display unit 19 which displays information and the input unit 20 which accepts the input operation with respect to the first display unit, the document holder 4 which sandwiches a document with the reading surface 16a of the reading unit 16, the supporter 6 which supports the document holder so as to rotate so that the facing state of the surface 5 of the document holder 4 with respect to the reading surface 16a of the reading unit 16 can be switched, the second display unit 21 which is disposed at the surface 5 of the document holder 4 and the CPU 11 which accepts the content of the input operation with respect to the second display unit 21 based on the content of the input operation carried out to the input unit 20.

Thereby, the second display unit 21 which is different from the first display unit 19 of the touch panel T can be provided. The second display unit 21 has a large display screen comparing to the first display unit 19. Therefore, the second display unit 21 can display more information in one display content.

Further, the second display unit 21 is disposed at the surface 5 of the document holder 4. Therefore, a large display unit can be provided without requiring a separate space for disposing a large display unit and a touch panel in the MFP 1. That is, the second display unit which can display more information in one display content can be provided without increasing the size of the image reading apparatus.

Furthermore, the input operation based on the content of the input operation carried out to the input unit 20 of the touch panel T can be carried out with respect to the display content of the second display unit 21. Therefore, the input operation with respect to the display content of the second display unit 21 can be carried out in a similar feeling as carrying out an input operation to the touch panel T. In addition, because more information can be displayed in one display content in the second display unit 21 due to the second display unit 21 having a large display screen comparing to the first display unit 19, options in the content of input operation with respect to a display content increases and the input operation with respect to the display content can be carried out more comfortably.

Moreover, the input operation based on the content of the input operation carried out to the input unit 20 of the touch panel T can be carried out with respect to the display content of the second display unit 21. Therefore, additional cost and space for providing a separate input device for carrying out input operations using the second display unit are not needed. That is, more information can be displayed in one display content without increasing the size of the image reading apparatus, and a display input device which includes more options in the content of input operation with respect to the display content can be provided.

Further, the CPU 11 switches between the process of accepting the operation content carried out to the input unit 20 with respect to the display content of the first display unit 19 and the process of accepting the operation content carried out to the input unit 20 with respect to the display content of the second display unit 21.

Thereby, even when using the document holder 4 to read a document, input operation can be carried out to the touch panel T and the input operation can be carried out regardless of the rotation angle of the document holder 4.

Moreover, the MFP 1 includes the document holder position detecting unit 22 which detects the facing state of the surface of the document holder 4 with respect to the reading surface 16a of the reading unit 16. Further, based on the facing state of the document holder 4 which is detected by the document holder position detecting unit 22, the CPU 11 carries out the process of accepting the operation content carried out to the input unit with respect to the display content of the first display unit 19 when the surface 5 of the document holder 4 faces the reading surface 16a of the reading unit 16, and the CPU 11 carries out the process of accepting the operation content carried out to the input unit 20 with respect to the display content of the second display unit 21 when the surface 5 of the document holder 4 does not face the reading surface 16a of the reading unit 16.

In such way, display switches between the first display unit 19 and the second display unit 21 automatically according to whether the surface 5 of the document holder 4 faces the reading surface 16a of the reading unit 16 or not. Therefore, a user does not need to carry out the switching operation of the display unit to be used for input operation. Thus, complicating operations associated with the input operation are not needed to be carried out and the input operation can be carried out more comfortably.

Further, when switching to the process of accepting the operation content carried out to the input unit 20 with respect to the display content of the first display unit 19 from the process of accepting the operation content carried out to the input unit 20 with respect to the display content of the second display unit 21, the CPU 11 decides the display content of the first display unit 19 of after the switching based on the display content of the second display unit 21 of before the switching.

Thereby, when the display unit which corresponds to the input operation carried out to the input unit 20 is to be switched to the first display unit 19 from the second display unit 21, the display contents of before the switching and of after the switching are related to each other. For example, by making the content of input operation that can be carried out based on the display content of the second display unit 21 of before the switching be similar to the content of input operation that can be carried out based on the display content of the first display unit 19 of after the switching, the content of input operation of before the switching can be continued promptly after switching. Therefore, complicating operations associated with the input operation are not needed to be carried out and the input operation can be carried out more comfortably.

Moreover, the input unit 20 accepts the input operation to change the position of the indicator (for example, arrow cursors C1, C2, C3 and the like) displayed in the second display unit 21 when the CPU 11 is carrying out the process of accepting the operation content carried out to the input unit 20 with respect to the display content of the second display unit 21, and the CPU 11 decides the display content of the first display unit 19 of after the switching based on the position of the indicator displayed in the second display unit 21 when switching to the process of accepting the operation content carried out to the input unit 20 with respect to the display content of the first display unit 19 from the process of accepting the operation content carried out to the input unit 20 with respect to the display content of the second display unit 21.

Because the position of the indicator in the second display unit 21 is decided based on the input operation carried out by a user, it is presumed that the display content corresponding to the position where the indicator is placed is highly related to the content of input operation carried out by a user. Therefore, by deciding the display content of the first display unit 19 of after the switching based on the position of the indicator in the second display unit 21 of before the switching, the content of input operation that can be carried out based on the display content of the second display unit 21 of before the switching can be made to be similar to the content of input operation that can be carried out based on the display content of the first display unit 19 of after the switching. Thus, the content of the input operation of before the switching can be continued after the switching promptly. Further, complicating operations associated with the input operation are not needed to be carried out and the input operation can be carried out more comfortably.

Furthermore, when switching to the process of accepting the operation content carried out to the input unit 20 with respect to the display content of the second display unit 21 from the process of accepting the operation content carried out to the input unit 20 with respect to the display content of the first display unit 19, the CPU 11 decides the display content of the second display unit 21 of after the switching based on the display content of the first display unit 19 of before the switching.

In such way, when the display unit which corresponds to the input operation carried out to the input unit 20 is to be switched to the second display unit 21 from the first display unit 19, the display contents of before the switching and of after the switching can be related to each other. For example, by making the content of input operation that can be carried out based on the display content of the first display unit 19 of before the switching be similar to the content of input operation that can be carried out based on the display content of the second display unit 21 of after the switching, the content of the input operation of before the switching can be continued after the switching promptly. Thereby, complicated operations associated with input operation are not needed to be carried out and the input operation can be carried out more comfortably.

Moreover, the MFP 1 includes the storage unit 14 which stores the correspondence table that corresponds the display content of the first display unit 19 of before the switching and the display content of the second display unit 21 of after the switching to each other, and the CPU 11 decides the display content of the second display unit 21 of after the switching based on the display content of the first display unit 19 of before the switching and the content of the correspondence table.

In such way, the correspondence of the display contents of before the switching and of after the switching can be set in advance. For example, by making the display content of the first display unit 19 of before the switching and the display content of the second display unit 21 of after the switching correspond to each other so that the content of input operation that can be carried out based on the display content of the first display unit 19 of before the switching and the content of input operation that can be carried out based on the display content of the second display unit 21 of after the switching be similar to each other as shown in the example of display content in FIG. 10 and the example of correspondence table in FIG. 11, the content of the input operation of before the switching can be continued after the switching promptly. Therefore, complicating operations associated with the input operation are not needed to be carried out and the input operation can be carried out more comfortably.

Here, the first embodiment is an exemplification in all aspects and is not limitative in any way. The scope of the present invention is shown by the scope of the claims and not by the above description, and all of the modifications within the scope of the claims and equity thereof are intended to be included.

For example, instead of disposing the display device at the surface 5 of the document holder 4, display may be carried out by projecting an image to the surface 5.

Figure 20:
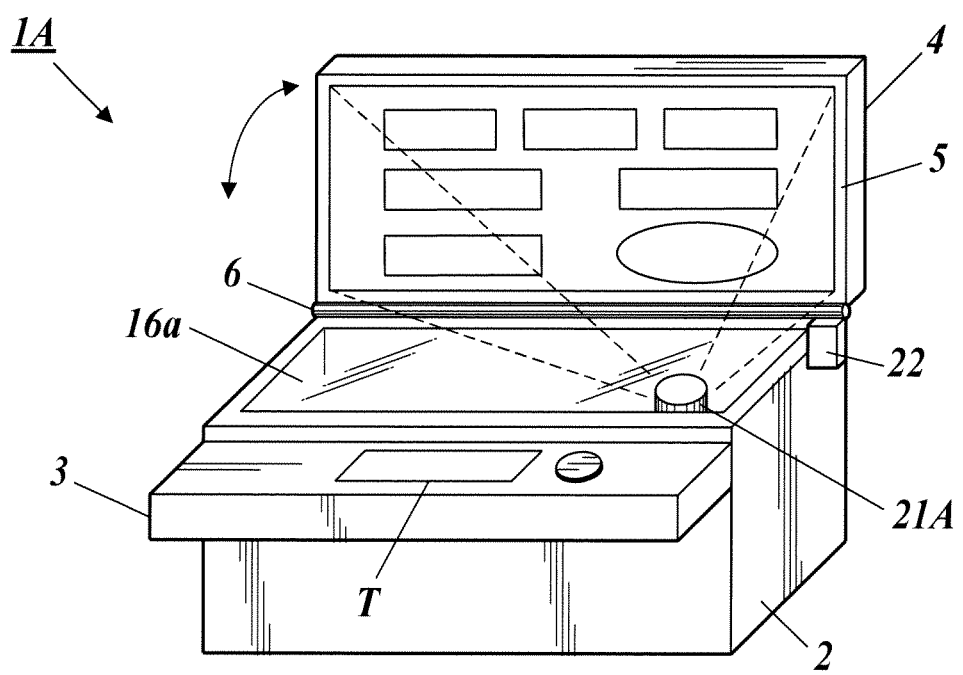
FIG. 20 is a diagram showing an example of a MFP 1A which carries out display on the surface of the document holder by projection.

In FIG. 20, an example of MFP 1A which carries out display by projecting an image to the surface 5 is shown.

As shown in FIG. 20, the MFP 1A includes a projector 21A.

The projector 21A is a display device which carries out display by projecting an image to the surface 5. The surface 5 of the MFP 1A is a surface of simple color (for example, white or the like) and is not provided with a display device. The projector 21A of the MFP 1A is disposed at lower part of the reading surface 16a of the reading unit 16 and projects an image by transmitting light through the reading surface 16a. However, the disposing position of the projector is not specifically limited.

In the case of carrying out display by the projector 21A, similar advantages as in the case where the second display unit 21 is provided can be obtained.

The configurations of the first embodiment may be replaced with other configurations having similar functions.

As an example, a resistance film type is applied for the input unit 20 in the above embodiment. However, the particular configuration, such as an electrostatic capacitance type, an electromagnetic induction type, an infrared type, a surface acoustic wave type and a matrix switch type, is not limited as long as the configuration functions as a touch panel in cooperation with the first display unit 19. Further, a light sensor is applied as the document holder position detecting unit 22 in the above embodiment. However, the particular configuration is not limited as long as it is a configuration by which a change in position of the document holder 4 can be detected, such as configurations of switching between on and off according to opening/closing of the document holder 4 or according to whether there is electric connection or not.

Moreover, in the first embodiment, the example of the MFP which includes the function of image reading apparatus is described. However, the present invention can be applied not only to MFP but also to any apparatuses having the function as an image reading apparatus.

Figure 21:
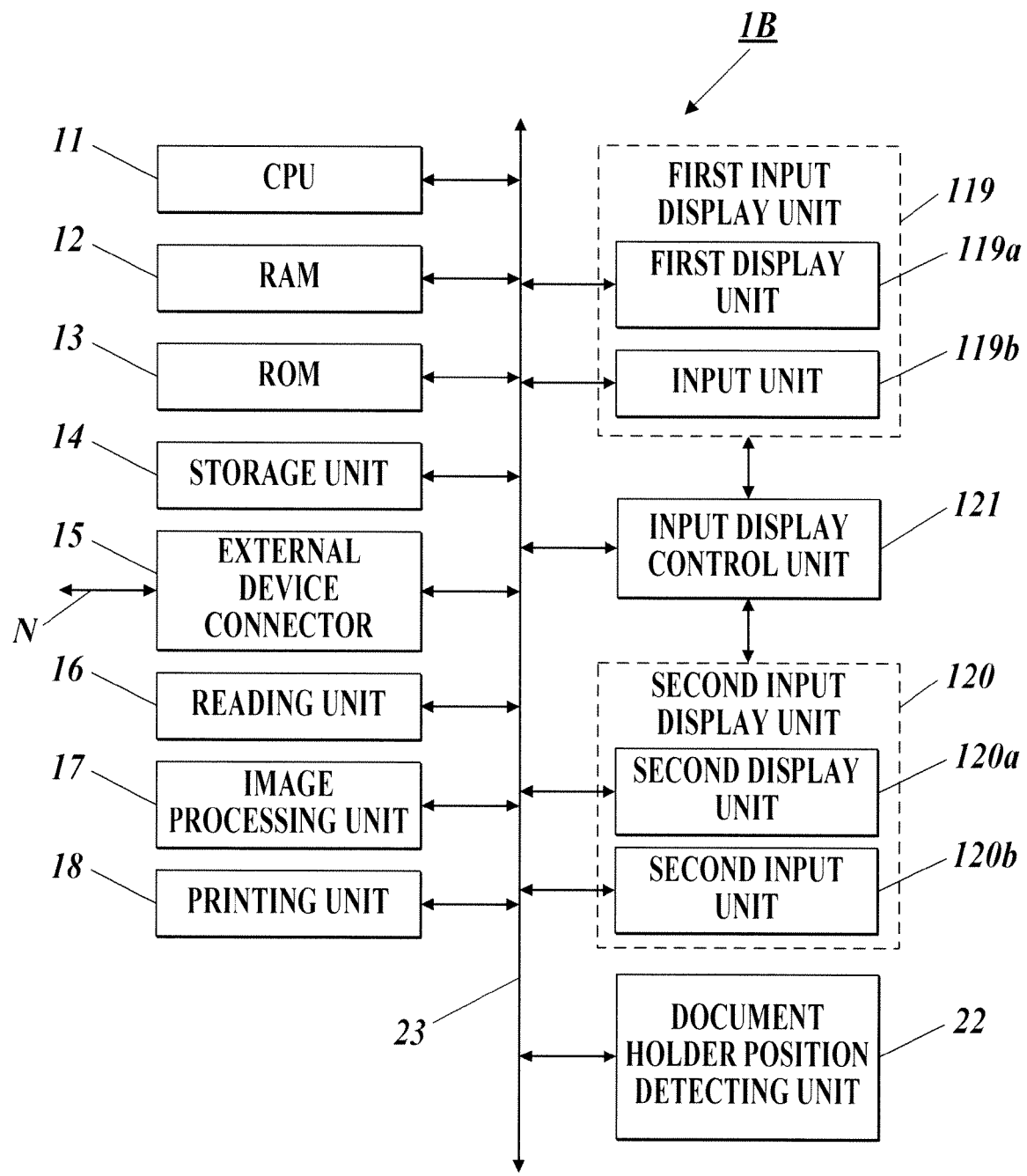
FIG. 21 is a block diagram of a MFP of the second embodiment of the image reading apparatus according to the present invention.

In FIG. 21, a block diagram of MFP 1B of the second embodiment of the image reading apparatus of the present invention is shown.

Figure 22:
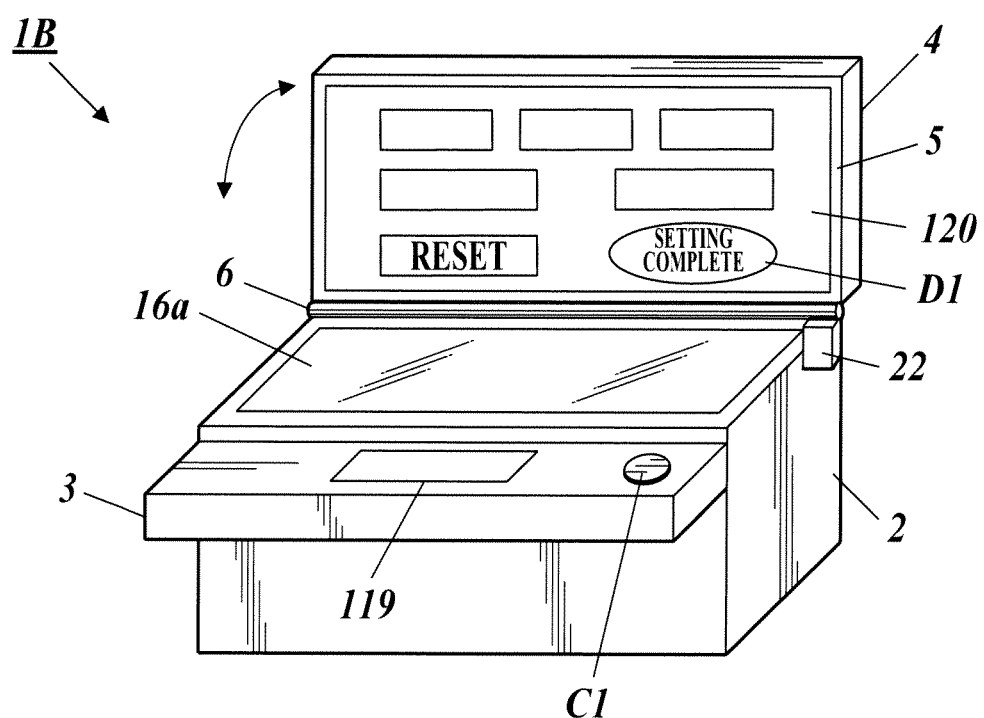
FIG. 22 is a diagram showing a schematic diagram of the MFP of the second embodiment.

In FIG. 22, a schematic diagram of the MFP 1B is shown.

The MFP 1B includes a CPU 11, a RAM 12, a ROM 13, a storage unit 14, an external device connector 15, a reading unit 16, an image processing unit 17, a printing unit 18, a document holder detecting unit 22, a first input display unit 119, a second input display unit 120 and an input display control unit 121, and these components are connected to each other by a bus 23.

The CPU 11, RAM 12, ROM 13, storage unit 14, external device connector 15, reading unit 16, image processing unit 17 and document holder detecting unit 22 of the second embodiment are similar to the CPU 11, RAM 12, ROM 13, storage unit 14, external device connector 15, reading unit 16, image processing unit 17 and document holder detecting unit 22 of the above described first embodiment. Therefore, descriptions thereof are omitted.

In the second embodiment, reading of a document by the reading unit 16 is carried out according to a predetermined input process. In the second embodiment, reading of a document (job) is started according to an input operation being carried out to a job start button C1. The job start button C1 is disposed at an extension unit 3. The extension unit 3 is provided so as to extend from a case 2 of the MFP 1B in lateral direction, and the extension unit 3 includes the first input display unit 119, the job start button C1 and other various types of input devices which are not shown in the drawing.

The first input display unit 119 includes the first display unit 119a and the first input unit 119b.

The first display unit 119a displays various types of information according to the operation of the MFP 1B.

The first display unit 119a is configured of a display device such as a crystal liquid display, an organic electro-luminescence (EL) display or the like, for example, and carries out information display under the control of the CPU 11.

The first input unit 119b accepts the input operation with respect to the first display unit 119a.

The first input unit 119b includes a film type input accepting unit (not shown in the drawing) having transparency, and the input accepting unit is provided so as to cover the display screen of the first display unit 119a.

For example, the input accepting unit has a configuration in which two metallic thin films having transparency are provided so as to face each other, and voltage is applied to either one of the metallic thin films. When an input operation (pushing operation) to the display screen of the first display unit 119a is carried out by a user, voltage occurs in the other metallic thins film according to the position where the input operation is carried out. The first input unit 119b specifies the position where the input operation by a user is carried out based on the voltage occurred in the other metallic thin film.

The first input display unit 119 functions as a touch panel by cooperating with the display content of the first display unit 119a and the content of the input operation specified by the first input unit 119b.

The second input display unit 120 includes the second display unit 120a and the second input unit 120b.

The second input display unit 120 is a touch panel which is provided separately from the first input display unit 119 and displays various types of information according to the operation of the MFP 1B. The second display unit 120a is disposed at the surface 5 of the document holder 4 shown in FIG. 22 and displays various types of information according to the operation of the MFP 1B. The size (area) of the display screen of the second display unit 120a is large comparing to the size (are) of the display screen of the first display unit 119a. That is, the second display unit 120a has a larger display area comparing to the first display unit 119a.

Figure 24:
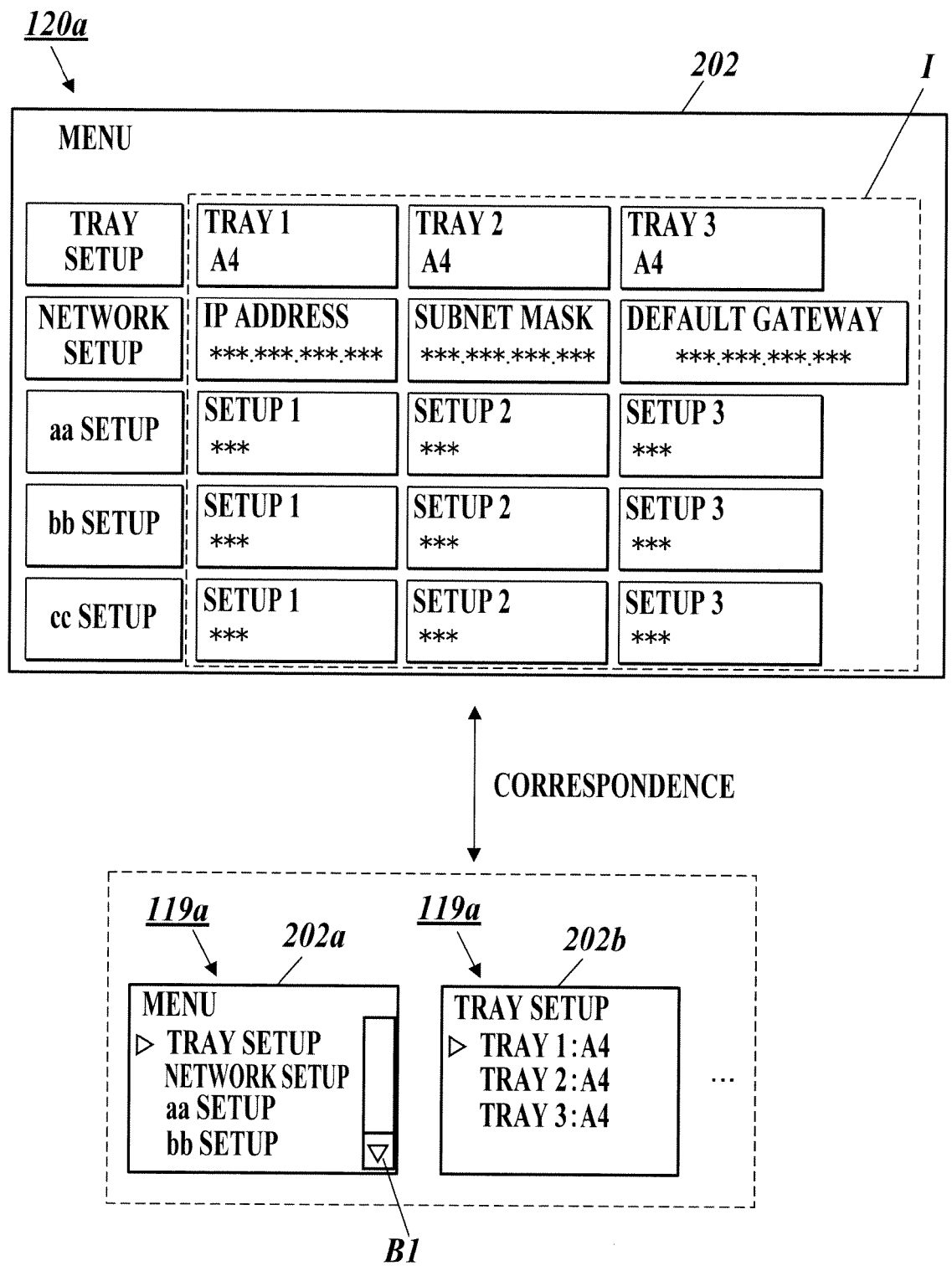
FIG. 24 is a diagram showing an example of another corresponding relation between the display content of the first display unit and the display content of the second display unit, in the second embodiment.

In FIGS. 23 and 24, examples of correspondence relation between the display content of the first display unit 119a and the display content of the second display unit 120a are shown.

Because the second display unit 120a has a large display area comparing to the first display unit 119a, the second display unit 120a can display more information comparing to the first display unit 119a. For example, as shown in FIG. 23, as for a plurality of items which are to be displayed by switching displays among a plurality of tabs (for example, tabs T1 to T5) in the first display unit 119a, the plurality of items can be displayed together in one screen to be viewed in the second display unit 120a. Further, as shown in FIG. 24, a plurality of items which requires input operation to the scroll bar B1 for viewing in the first display unit 119a and the display content of a plurality of screens (for example, screens 202a, 202b and the like) of the first display unit 119a can be displayed together in one screen to be viewed in the second display unit 120a. In addition, in the case of the example shown in FIG. 24, information on each item not displayed in the first display unit 119a can be displayed together in one screen to be viewed in the second display unit 120a (for example, information I shown in FIG. 24).

Figure 25:
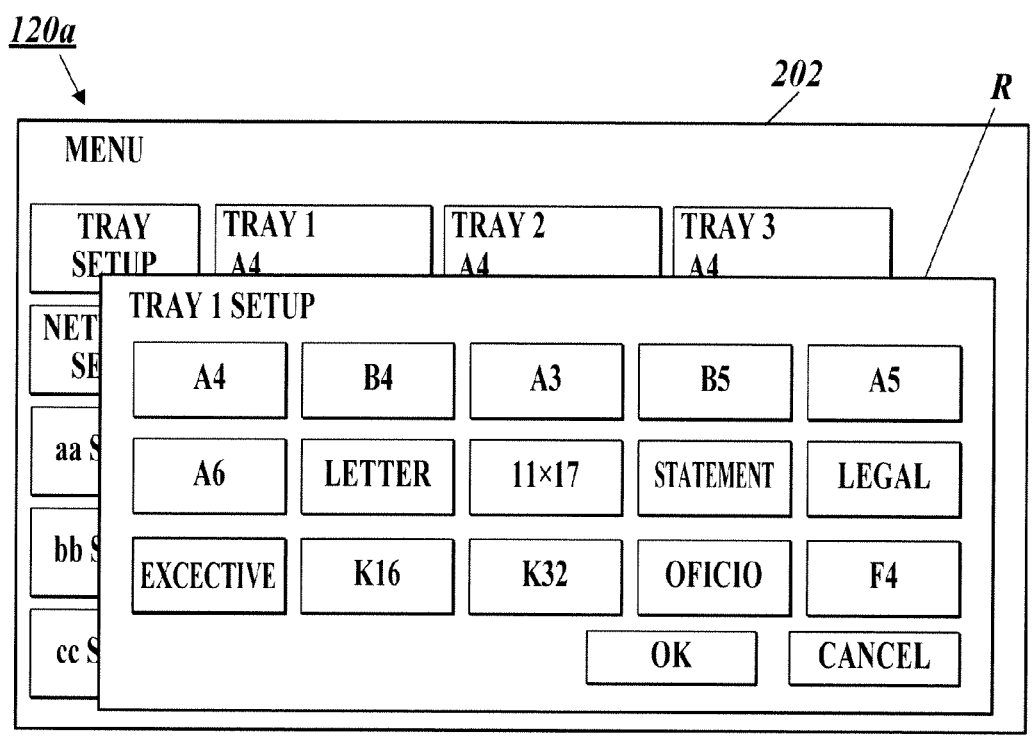
FIG. 25 shows an example of the display content of the second display unit in the second embodiment.
Figure 26A:
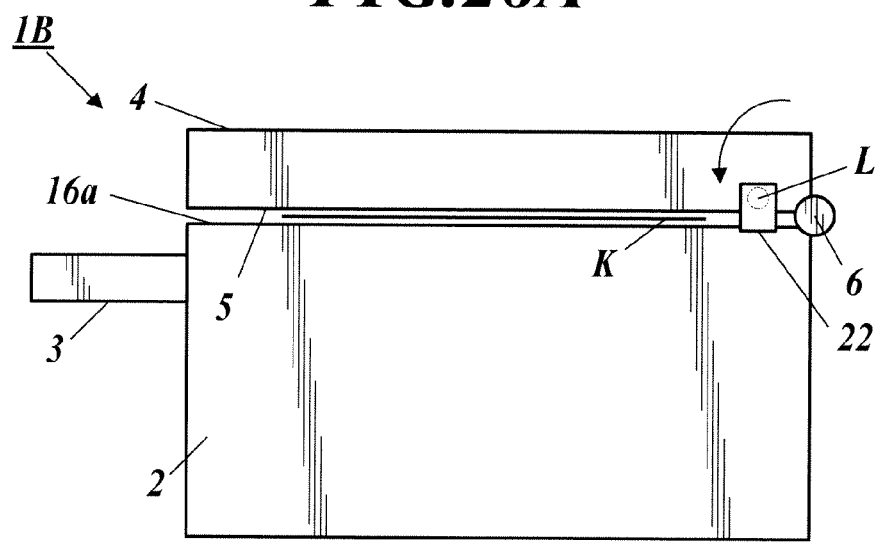
FIG. 26A is a diagram showing an example where the surface of the document holder faces the reading surface of the reading unit, in the second embodiment.
Figure 26B:
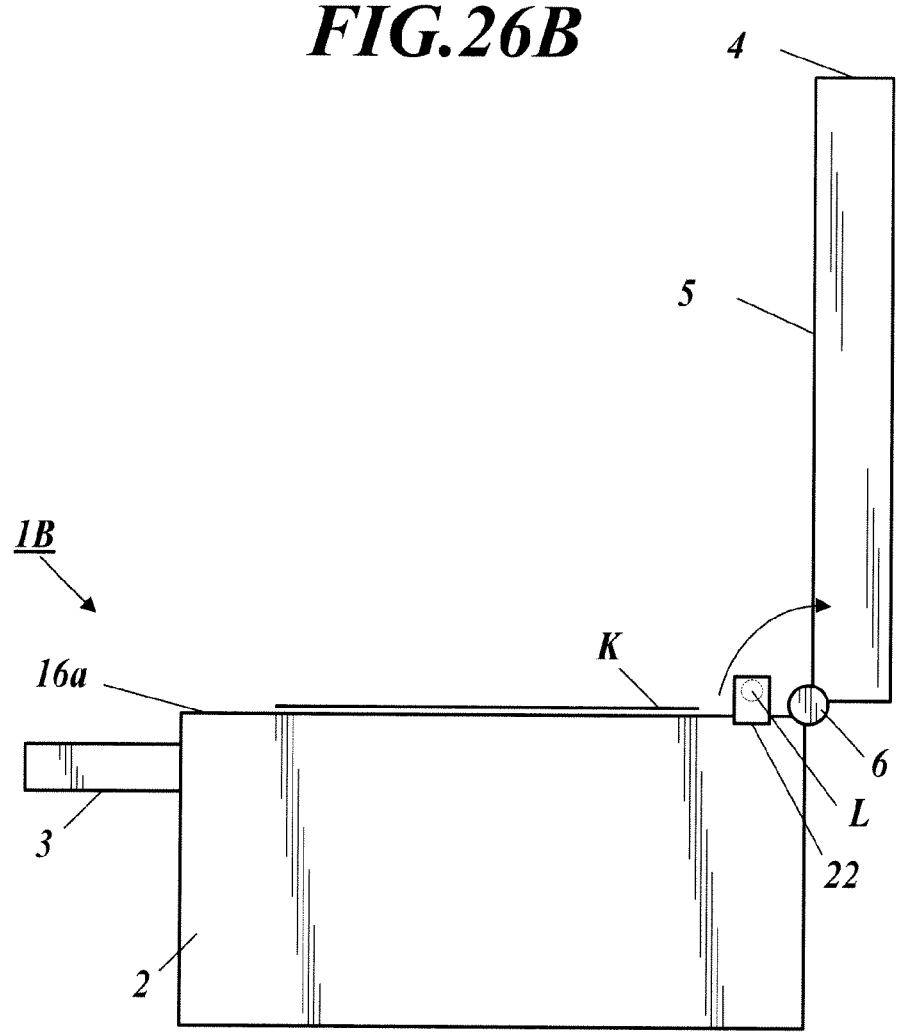
FIG. 26B is a diagram showing an example where the surface of the document holder does not face the reading surface of the reading unit, in the second embodiment.

In FIG. 25, an example of the display content of the second display unit 120a is shown.

In the first display unit 119a of FIG. 24, switching of display contents is required in order to display a plurality of screens of the display contents respectively corresponding to hierarchy states which are managed by hierarchy system. With respect to the plurality of screens of the display contents, they can be displayed in a multi layer format in one display screen in the display by the second display unit 120a. For example, when setting the paper size of "tray 1" in "tray setting", a layer (layer R) indicating options of paper size is displayed in the same screen as shown in FIG. 25. When any one is selected from the paper sizes displayed in the layer, the selected paper size is set as the paper size of "tray 1" and the layer will not be displayed. Similar process can be carried out to other setting items and other display contents.

The second input unit 120b is an input device provided so as to cover the display screen of the second display unit 120a and accepts input operation with respect to the second display unit 120a.

The particular configurations of the second display unit 120a and the second input unit 120b are similar to that of the first display unit 119a and the first input unit 119b except for their sizes and setting locations.

The surface 5 of the document holder 4 where the second input display unit 120 is disposed is provided so that a document (for example, paper document and the like) can be placed between the surface 5 and the reading surface 16a at the position where the surface 5 faces the reading surface 16a of the reading unit 16.

The document holder 4 of the second embodiment is provided so as to rotate with respect to the reading surface 16a by setting the support 6 as the rotation shaft. By the document holder 4 changing its rotation angle with respect to the reading surface 16a, the position where the surface 5 faces the reading unit 16a and the position where the surface 5 does not face the reading surface 16a are switched. That is, the support 6 supports the document holder 4 so that the facing states of the surface 5 of the document holder 4 with respect to the reading surface 16a of the reading unit 16, which are facing or not-facing, can be switched.

The input display control unit 121 controls the operation of the first input display unit 119 and the second input display unit 120. Hereinafter, the operation control of the first input display unit 119 and the second input display unit 120 carried out by the input display control unit 121 will be described.

The input display control unit 121 switches the second input display unit 120 between an operating state and a not-operating state based on the facing state of the document holder 4. The input display control unit 121 obtains the position of the document holder 4 which is detected by the document holder position detecting unit 22 and specifies the facing state of the document holder 4. Then, when the document holder 4 is at the position of facing the reading unit 16, the input display control unit 121 makes the second input display unit 120 be in the not-operating state, and when the document holder 4 is at the position of not facing the reading unit 16, the input display control unit 121 makes the second input display unit 120 be in the operating state.

When a change in the facing state of the document holder 4 is detected by the document holder position detecting unit 22, the input display control unit 121 switches the operation state of the second input display unit 120. In particular, the input display control unit 121 ends the operation of the second input display unit 120 and makes the second input display unit 120 be in the not-operating state when the document holder 4 is at the position of facing the reading unit 16, and the input display control unit 121 makes the second input display unit 120 be in the operating state when the document holder 4 is at the position of not facing the reading unit 16.

The input display control unit 121 is a circuit, such as a firmware, which operates by reading out a program. The input display control unit 121 carries out the operation control so as to make the display content of the first display unit 119a and the display content of the second display unit 120a be associated to each other when switching the operation states of the first input display unit 119 and the second input display unit 120.

In particular, when the display content of the first display unit 119a is changed according to the input content carried out to the first input display unit 119 while the second input display unit 120 is operating, the input display control unit 121 changes the display content of the second display unit 120a based on the change in the display content of the first display unit 119a. Similarly, when the display content of the second display unit 120a is changed according to the input content carried out to the second input display unit 120 while the second input display unit 120 is operating, the input display control unit 121 changes the display content of the first display unit 119a based on the change in display content of the second display unit 120a.

Further, the input display control unit 121 decides the display content of the second display unit 120a based on the display content of the first display unit 119a and the correspondence table.

In FIG. 27, an example of the content of the correspondence table is shown.

The correspondence table is stored in the storage unit 14.

In the correspondence table, one or a plurality of display contents which are to be displayed in the first display unit 119a is made to correspond with one display content which is to be displayed in the second display unit 120a. For example, the screen 201a of the first display unit 119a shown in FIG. 23 is made to correspond with the screen 201 of the second display unit 120a in the correspondence table. Further, a plurality of screen including other screens which are not shown in the drawing such as the screens 202a, 202b of the first display unit 119a shown in FIG. 24 are made to correspond with the screen 202 of the second display unit 120a.

When operating the second input display unit 120, the input display control unit 121 obtains the display content of the first display unit 119a and the correspondence table. Next, the input display control unit 121 specifies the display content of the second display unit 120a which corresponds to the obtained display content of the first display unit 119a using the correspondence table. Then, the input display control unit 121 displays the specified display content in the second display unit 120a when operating the second input display unit 120.

Here, a predetermined display content to be displayed in the first display unit 119a is not made to correspond with a display content to be displayed in the second display unit 120a.

For example, in the correspondence table shown in FIG. 27, the screen of the second display unit 120a that corresponds to the password setting screen which is to be displayed in the first display unit 119a is not set.

As for the display content of the first display unit 119a to which any display content of the second display unit 120a is not made to correspond in the correspondence table, the input display control unit 121 does not carry out the display thereof in the second display unit 120a.

By not allowing the display of information requiring high confidentiality such as password in the second display unit 120a, the possibility of the password being viewed by a person other than a user who set the password can be reduced. As for display of other information requiring high confidentiality such as a screen relating to security, not limited to the password setting screen, confidentiality of the input of such information by using the first display unit 119a can be improved.

The input display control unit 121 displays the information which is changed by the input operation carried out to the first input display unit 119 or the second input display unit 120 in the first display unit 119a and the second display unit 120a so as to be discriminable from the unchanged information.

Figure 28:
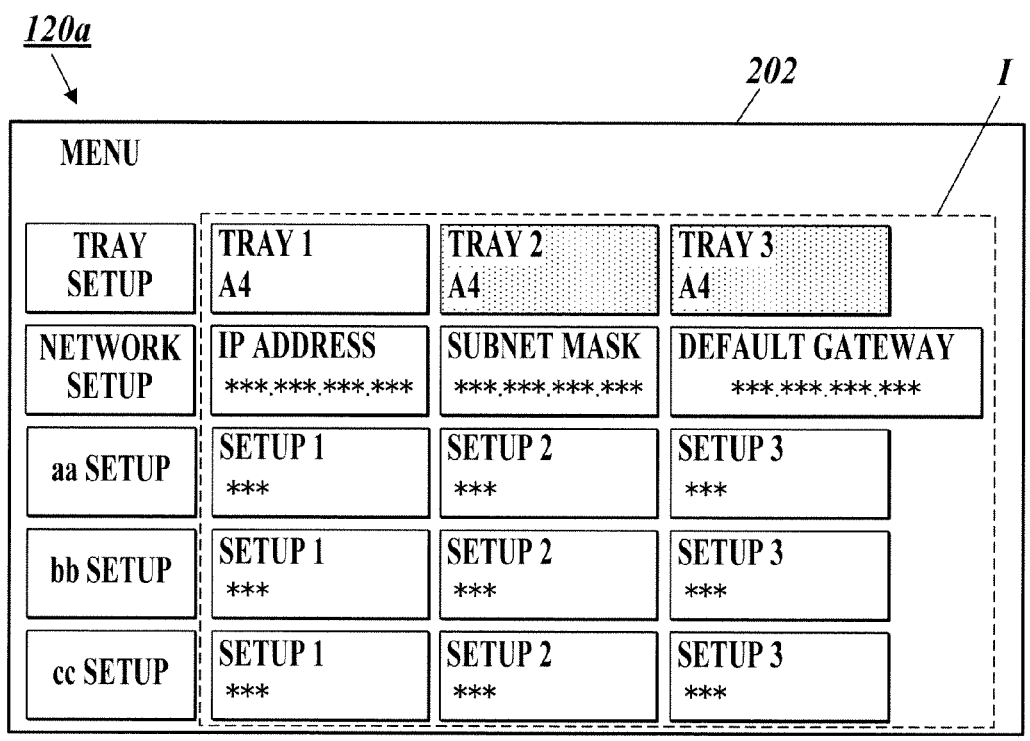
FIG. 28 is a diagram showing an example of the display content of the second display unit which displays information changed by an input operation and unchanged information so as to be discriminable, in the second embodiment.

An example of the display content of the second display unit 120 in which the information changed by the input operation is displayed so as to be discriminable from the unchanged information will be shown by using FIG. 28.

For example, when paper sizes are changed in the setting items of page size (A4) of "tray 2" and page size (a4) of "tray 3" in "tray setting" included in the screen 202 shown in FIG. 24, inside of the frames which surround the items "tray 2" and "tray 3" in which the settings are changed are displayed in a color different from the color of other items as shown in FIG. 28.

In FIG. 28, a case of the second display unit 120a is exemplified. However, the changed information are displayed so as to be discriminable from the unchanged information in the first display unit 119a in similar way.

Here, the method for displaying so that the changed information and the unchanged information are discriminable from each other is not limited to the method described above. For example, a method that displays the letters or the letter strings indicating the changed information in a different color, a method that displays the letters or the letter string in different form and the like are suggested, and the changed information and the unchanged information can be displayed so as to be discriminable by using any one of the above methods or combinations of a plurality of methods. As for the different forms for displaying the letters and letter stings, cases where using different boldface type, applying shading, showing accessories such as under lines, using different font type and the like are suggested as examples.

Furthermore, a case where the paper size of "tray 2" is changed to "B5" and the paper size of "tray 3" is changed to "A3" is shown in FIG. 28. However, change in setting is not limited the this example, and similar process is to be carried out when the page size is changed to other sizes, when other setting item is changed, when information is changed in other display content and the like.

The content of the input operation carried out via the second input display unit 120 is accepted only when the second input display unit 120 is operating and information corresponding to the content of the input operation is inputted to the CPU 11. The content of the input operation carried out via the first input display unit 119 is accepted regardless of whether the second input display unit 120 is operating or not operating and information corresponding to the content of the input operation is inputted to the CPU 11. That is, when the second input display unit 120 is not operating, the MFP 1B accepts the information display and the input operation via the first input display unit 119. Furthermore, when the second input display unit 120 is operating, the MFP 1B accepts the information display and the input operation via the first input display unit 119 and the second input display unit 120.

The content which is inputted via the first input display unit 119 and the second input display unit 120 are inputted to the CPU 11 and they are to be reflected to the processing content of the CPU 11.

When the document holder 4 is opened and the second input display unit 120 is operating, the CPU 11 assumes that the setting operation with respect to the MFP 1B is being carried out and does not accept the input to the job start button C1.

When the document holder 4 moves to the position of facing the reading unit 16 by the document holder 4 being closed in a state where the second input display unit 120 is operating, the input display control unit 121 assumes that the setting operation with respect to the MFP 1B is completed and disapproves the input accepting carried out by the second input unit 120b and carries out an operation control of coloring the entire display area of the second display unit 120a in a simple color (for example, white). Then, the CPU 11 is to be on standby in a state where a job can be started according to an input to the job start button C1.

Further, when an operation with respect to the input operation to the setting complete button (for example, setting complete button D1 shown in FIG. 22 and the like) which is displayed in the top menu screen of the first input display unit 119 and the second input display unit 120 is carried out, the input display control unit 122 also assumes that the setting operation with respect to the MFP 1B is completed and the CPU 11 is to be on standby in a state where a job can be started according to an input to the job start button C1.

Figure 29:
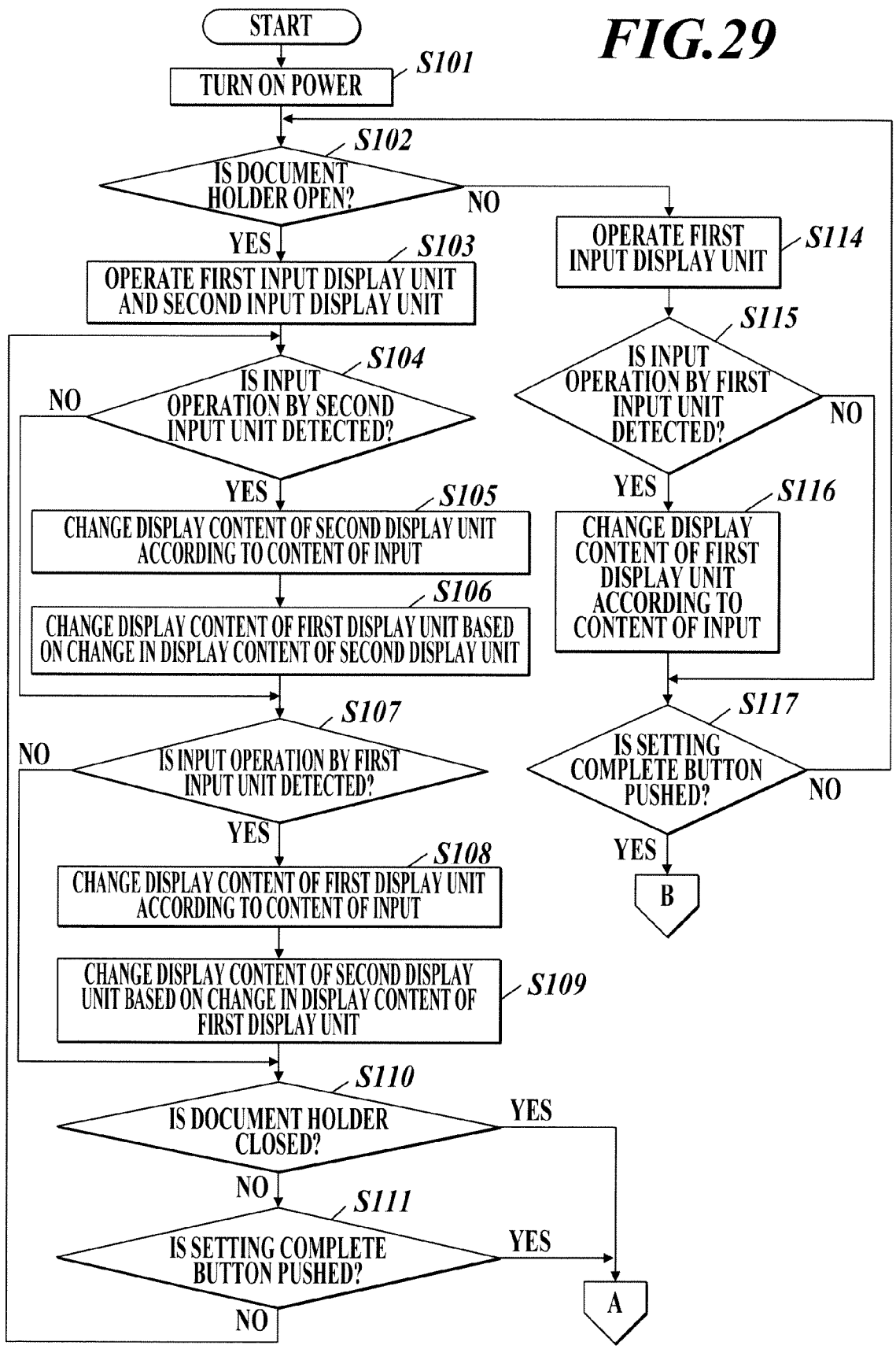
FIG. 29 is a diagram showing steps S101 to S111 and steps S114 to S117 in the flowchart showing an example of the flow of the process carried out in the MFP of the second embodiment.
Figure 30:
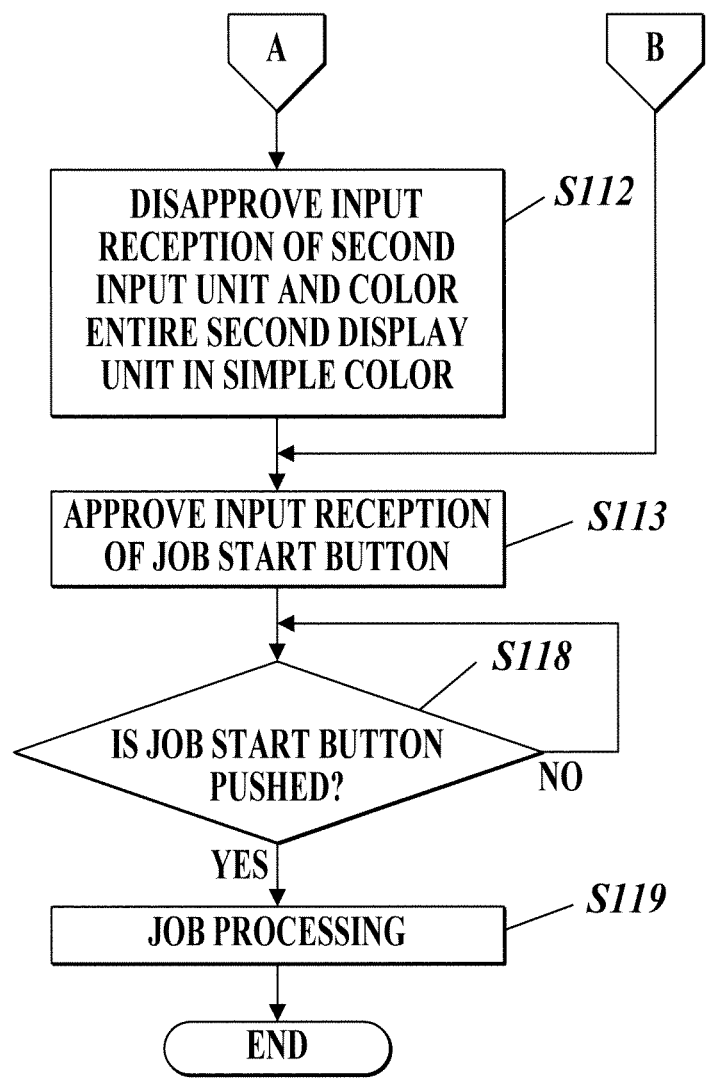
FIG. 30 is a diagram showing steps S112, S113, S118 and S119 in the flowchart showing an example of the flow of the process carried out in the MFP of the second embodiment.

Next, flow of the processing in the MFP 1B will be described by using the flowchart of FIGS. 29 and 30.

When the power (not shown in the drawing) of the MFP 1B is turned on (step S101), the input display control unit 121 obtains the position of the document holder 4 which is detected by the document holder position detecting unit 22 and determines whether the document holder 4 is opened or not, that is whether the surface 5 of the document holder 4 is at the position of not facing the reading surface 16a of the reading unit 16 or not (step S102). When the document holder 4 is opened (step S102; YES), the input display control unit 121 operates the first input display unit 119 and the second input display unit 120 (step S103).

After the process of step S103, the input display control unit 121 checks whether the second input unit 120b detected an input operation or not (step S104). When the second input unit 120 detected an input operation (step S104: YES), the display content of the second display unit 120a is changed according to the input content carried out to the second input unit 120b (step S105), and changes the display content of the first display unit 119a based on the change in the display content of the second display unit 120a which occurred in the process of step S105 (step s106).

After the process of step S106 or when the second input unit 120b does not detect an input operation in step S104 (step S104: NO), the input display control unit 121 checks whether the first input unit 119b detected an input operation or not (step S107). When the first input unit 119b detected an input operation (step S107: YES), the display content of the first display unit 119a is changed according to the input content carried out to the first input unit 119b (step S108) and the display content of the second display unit 120a is changed based on the change in the display content of the first display unit 119a which occurred in the process of step S108 (step S109).

After the process of step S109 or when the first input unit 119b does not detect an input operation in step S107 (step S107: NO), the input display control unit 121 obtains the position of the document holder 4 which is detected by the document holder position detecting unit 22 and determines whether the document holder 4 is closed or not, that is whether the surface 5 of the document holder 4 is moved to the position of facing the reading surface 16a of the reading unit 16 or not (step S110). When the document holder 4 is closed (step S110: NO), the input display control unit 121 determined whether the setting complete button is pushed or not (step S111).

When the surface 5 of the document holder 4 moved to the position of facing the reading surface 16a of the reading unit 16 (step S110: YES) or when the setting complete button is pushed (step S111: YES), the input display control unit 121 disapproved the input accepting carried out by the second input unit 120b and carries out the operation control of coloring the entire display area of the second display unit 120a in a simple color (for example, while) (step S112). Then, the CPU 11 be in a state where the input operation to the job start button can be accepted (step S113).

When the setting complete button is not pushed (step S111: NO), the process is returned to the process of step S104.

On the other hand, when the document holder 4 is determined as being closed in the determination of step S102, that is when the surface 5 of the document holder 4 is facing the reading surface 16a of the reading unit 16 (step S102: NO), the input display control unit 121 operates the first input display unit 119 (step S114). Then, the input display control unit 121 checks whether the first input unit 119b detected an input operation or not (step S115). When the first input unit 119b detected an input operation (step S115: YES), the display content of the first display unit 119a is changed according to the input content carried out to the first input unit 119b (step S116).

After the process of step S116 or when the first input unit 119b does not detect an input operation in step S115 (step S115: NO), the input display control unit 121 determines whether the setting complete button is pushed or not (step S117). When the setting complete button is pushed (step S117: YES), the process of step S113 is carried out. When the setting complete button is not pushed (step S117: NO), the process returns to the process of step S102.

After the process of step S113, the CPU 11 is to be on standby until the job start button C1 is pushed (step S118: NO). When the job start button C1 is pushed (step S118: YES), the CPU 11 processes the job (step S19) and thereafter, the CPU 11 ends the process.

As described above, according to the second embodiment, the MFP 1B includes the first input display unit 119 having the first display unit 119a which displays information and the first input unit 119b which accepts the input operation with respect to the first display unit 119a, the document holder 4 which sandwiches a document with the reading unit 16, the support 6 which supports the document holder 4 so as to rotate so that the facing state of the document holder 4 with respect to the reading unit 16 can be switched, the second input display unit 120 having the second display unit 120a which is disposed at the surface 5 of the document holder 4 that faces the reading surface 16a of the reading unit 16 and the second input unit 120b which accepts the input operation with respect to the second display unit 120a, the document holder position detecting unit 22 which detects the facing state of the document holder 4 with respect to the reading unit 16 and the input display control unit 121 which switches the second input display unit 120 between the operating state and the not-operating state based on the facing state of the document holder 4 which is detected by the document holder position detecting unit 22.

Thereby, the second input display unit 120 which is different from the first input display unit 119 can be disposed at the surface 5 of the document holder 4. Because the second display unit 120a has a larger display screen comparing to the first display unit 119a, more information can be included in one display content of the second display unit 120a.

Further, because the second input display unit 120 is disposed at the surface 5 of the document holder 4, a large display unit can be provided without separately providing a space for disposing a large display unit and a touch panel. That is, the second display unit 120a in which more information can be displayed in one display content can be provided without increasing the size of the image reading apparatus.

Further, the second input display unit 120 functions as a touch panel. Therefore, input operation with respect to the display content of the second display unit 120a can be carried out in a similar feeling as carrying out input operation to the conventional touch panel. In addition, the second display unit 120a can include more information in one display content by having a large display screen comparing to the first display unit 119a. Therefore, options in the content of input operation with respect to the display content increases and the input operation with respect to the display content can be carried out comfortably.

Moreover, because the first input display unit 119 is included, information display and input accepting in the first input display unit 119 can be carried out when information display and input accepting by using the second input display unit 120 cannot be carried out due to the surface 5 of the document holder 4 facing the reading surface 16a of the reading unit 16 such as when a document is being sandwiched by the document holder 4 and the reading unit 16.

Further, the input display control unit 121 makes the second input display unit 120 be in the not-operating state when the surface 5 of the document holder 4 faced the reading surface 16a of the reading unit 16, and the input display control unit 121 makes the second input display unit 120 be in the operating state when the surface 5 of the document holder 4 does not face the reading surface 16a of the reading unit 16.

In such way, the operating state and the not-operating state of the second input display unit 120 is switched automatically according to whether the surface 5 of the document holder 4 faces the reading surface 16a of the reading unit 16 or not. Therefore, a user does not need to carry out the switching operation between the operating state and the not-operating state of the second input display unit 120. Thus, complicating operations associated with the input operation do not need to be carried out and the input operation can be carried out comfortably.

Further, the input display control unit 121 decides the display content of the second display unit 120a based on the display content of the first display unit 119a when the second input display unit 120 is to be operated.

In such way, the information display and accepting of input operation using the first input display unit 119 can be made to be associated with the information display and accepting of input operation using the second input display unit 120. Therefore, a user can carry out the information display and the input operation anytime by using an arbitrary input display unit. Further, after accepting of the information display and the input operation using the first input display unit 119 is started, when the second input display unit 120 operates due to the document holder 4 being opened, the content of the information display and accepting of the input operation by using the first input display unit 119 can be taken over by the second input display unit 120 by deciding the display content of the second display unit 120a based on the first display unit 119a. Therefore, switching to the information display and accepting of the input operation by the second input display unit 120 from the information display and accepting of the input operation by the first input display unit 119 can be carried out promptly.

Further, the MFP 1B includes the storage unit 14 which stores the correspondence table in which the display content of the first display unit 119a and the display content of the second display unit 120a are made to correspond to each other, and the input display control unit 121 decides the display content of the second display unit 120a based on the display content of the first display unit 119a and the content of the correspondence table.

In such way, the correspondence between the display content of the first display unit 119a and the display content of the second display unit 120a can be set in advance. For example, by making the display content of the first display unit 119a and the display content of the second display unit 120a correspond to each other so that the content of the input operation that can be carried out based on the display content of the first display unit 119a and the content of the input operation that can be carried out based on the display content of the second display unit 120a be similar, the information display and acceptance of the input operation by the first input display unit 119 and the information display and acceptance of the input operation by the second input display unit 120 can be associated to each other. Therefore, a user can carry out information display and input operation any time by using an arbitrary input display unit.

Further, in the correspondence table, one or a plurality of display contents to be displayed in the first display unit 119a and one display content to be displayed in the second display unit 120a are made to correspond with each other.

In such way, the contents corresponding to the plurality of display contents to be displayed in the first display unit 119a can be included in one display content which is to be displayed in the second display unit 120a having a large display area comparing to the first display unit 119a. Therefore, more information can be displayed in one display content to be displayed by the second display unit 120a. In addition, options in the content of input operation with respect to the display content of the second input display unit 120 ban be increased and the input operation with respect to the display content can be carried out comfortably.

Moreover, the corresponding information does not make a predetermined display content to be displayed in the first display unit 119a correspond to the display content to be displayed in the second display unit 120a, and the input display control unit 121 does not display the predetermined display content which is displayed in the first display unit 119a in the second display unit 120a.

In such way, confidentiality of input of the information based on the predetermined display content can be improved. As for the information display which requires confidentiality, confidentiality of the input of the information using the first display unit 119a can be improved by not making the information correspond to the display content of the second display unit 120*a* in the correspondence table.

Further, the information which is changed by the input operation carried out to the first input display unit 119 or the second input display unit 120 is displayed so as to be discriminable from the unchanged information.

In such way, by viewing the display contents of the first display unit 119*a* and the second display unit 120*a*, the information which is changed by the input operation carried out to the first input display unit 119 or the second input display unit 120 can be clearly discriminated from the unchanged information.

Here, the embodiment is an exemplification in all aspects and is not limitative in any way. The scope of the present invention is shown by the scope of the claims and not by the abode description, and all of the modifications within the scope of the claims and equity thereof are intended to be included.

For example, the second input display unit does not need to use the full screen or nearly full screen of the surface of the document holder. The second input display unit may be disposed to a part of the surface of the document holder.

Figure 31:
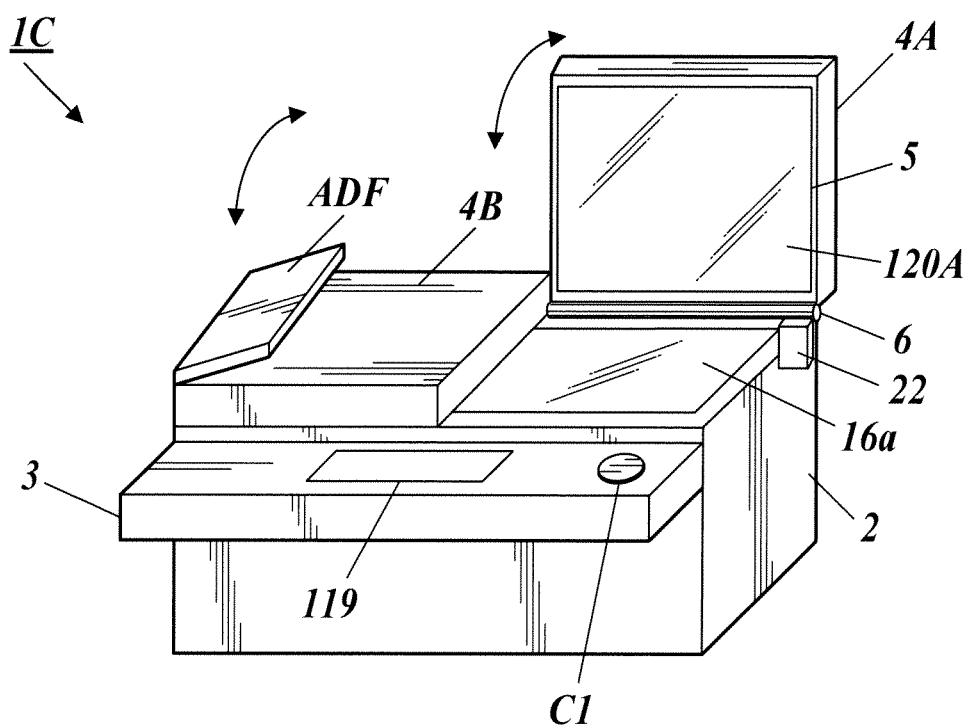
FIG. 31 is a diagram showing an example where the second input display unit is provided at a portion of the document holder.

In FIG. 31, an example in which the second input display unit is provided to a portion of the document holder is shown.

The document holder of the MFP 1C shown in FIG. 31 includes two document holders 4A and 4B each of which are provided so as to rotate independently. The document holders 4A and 4B are provided so as to respectively cover the left half and the right half of the reading surface 16*a* of the reading unit 16, where the reading unit 16*a* of the reading unit 16 is made in half with respect to its longitudinal direction, when the surfaces of the document holders 4A and 4B are positioned at the positions of facing the reading surface 16*a* of the reading unit 16.

As shown in FIG. 31, the document holder 4A which is one of the document holders includes the second input display unit 120A at the surface thereof. The second input display unit 120A has a configuration similar to that of the second input display unit 120 except for the size.

As shown in FIG. 31, when the second input display unit 120A is provided to a portion of the document holder, the size of the second input display unit 120A is smaller comparing to the second input display unit 120 which is provided by using the full surface or nearly full surface of the surface of the document holder. However, still, an input display device having large display screen and large screen to which the input operation can be carried out comparing to the conventional touch panel can be provided. Therefore, advantage similar to that of the above described embodiment can be obtained.

In addition, the document holder 4B to which the second input display unit 120A is not provided can be used independently from the document holder 4A. Therefore, confirmation of information and input operation can be carried out by using the second input display unit 120A while sandwiching a document between the document holder 4A and the reading unit 16. Further, as shown in FIG. 31, when an automatic document reading device (ADF) is provided to the document holder 4B, confirmation of information and input operation using the second input display unit 120A can be carried out even when the automatic document reading device is being used.

Each of the two document holders 4A and 4B of the MFP 1C shown in FIG. 31 is provided so as to cover half of the reading surface 16*a* of the reading unit 16 when the surface of each of the document holders 4A and 4B is at the position of facing the reading surface 16*a* of the reading unit 16. However, the size of the two document holders 4A and 4B and the ratio of the area of the reading surface 16*a* of the reading unit 16 to be covered by each of the document holders are not specifically limited.

Moreover, the configurations of the above embodiment can be replaced with other configuration having similar functions. As an example, a resistance film type is applied as the input unit 20*b* of the above embodiment. However, the particular configuration, such as an electrostatic capacitance type, an electromagnetic induction type, an infrared type, a surface acoustic wave type and a matrix switch type, is not limited as long as the configuration functions as a touch panel in cooperation with the first display unit 119*a*. Further, alight sensor is applied as the document holder position detecting unit 22 in the above embodiment. However, the particular configuration is not limited as long as it is a configuration by which a change in position of the document holder 4 can be detected, such as configurations of switching between on and off according to opening/closing of the document holder 4 or according to whether there is electric connection or not.

Moreover, the MFP having a function as an image reading apparatus is shown as an example in the above embodiment. However, the application of the present invention not limited to MFP, and the present invention can be applied to any apparatus as long as it is an apparatus having a function as an image reading apparatus.

Here, "document" in the description of the present invention indicates all of the materials which can be read by being placed on the reading unit of the image reading apparatus and is not limited to a paper medium.

According to an aspect of the preferred embodiments of the present invention, there is provided an image reading apparatus which reads a document placed on a reading unit including a display input unit including a first display unit which displays information and an input unit to accept an input operation with respect to the first display unit, a document holder which sandwiches the document with the reading unit, a support which supports the document holder so as to rotate so that a facing state of the document holder with respect to the reading unit is switchable, a second display unit which includes a surface of the document holder which faces the reading unit and the second display unit carries out a display in the surface.

Thereby, the second display unit 21 which is different from the first display unit 19 of the touch panel T can be provided. The second display unit 21 has a large display screen comparing to the first display unit 19. Therefore, the second display unit 21 can display more information in one display content.

Further, the second display unit 21 is disposed at the surface 5 of the document holder 4. Therefore, a large display unit can be provided without requiring a separate space for disposing a large display unit and a touch panel in the MFP 1. That is, the second display unit which can display more information in one display content can be provided without increasing the size of the image reading apparatus.

According to an aspect of the preferred embodiments of the present invention, the image reading apparatus further comprising a control unit which accepts a content of an input operation with respect to the second display unit based on a content of the input operation carried out to the input unit.

Thereby, the input operation based on the content of the input operation carried out to the input unit 20 of the touch panel T can be carried out with respect to the display content of the second display unit 21. Therefore, the input operation with respect to the display content of the second display unit 21 can be carried out in a similar feeling as carrying out an input operation to the touch panel T. In addition, because more information can be displayed in one display content in the second display unit 21 due to the second display unit 21 having a large display screen comparing to the first display unit 19, options in the content of input operation with respect to a display content increases and the input operation with respect to the display content can be carried out more comfortably.

Moreover, the input operation based on the content of the input operation carried out to the input unit 20 of the touch panel T can be carried out with respect to the display content of the second display unit 21. Therefore, additional cost and space for providing a separate input device for carrying out input operations using the second display unit are not needed. That is, more information can be displayed in one display content without increasing the size of the image reading apparatus, and a display input device which includes more options in the content of input operation with respect to the display content can be provided.

According to an aspect of the preferred embodiments of the present invention, the control unit switches between a process of accepting an operation content carried out to the input unit with respect to a display content of the first display unit and a process of accepting an operation content carried out to the input unit with respect to a display content of the second display unit based on a predetermined condition.

Thereby, even when using the document holder 4 to read a document, input operation can be carried out to the touch panel T and the input operation can be carried out regardless of the rotation angle of the document holder 4.

According to an aspect of the preferred embodiments of the present invention, the image reading apparatus further comprises a detecting unit which detects the facing state of the document holder with respect to the reading unit, and based on the facing state of the document holder detected by the detecting unit, the control unit carries out the process of accepting the operation content carried out to the input unit with respect to the display content of the first display unit when the document holder is facing the reading unit and carries out the process of accepting the operation content carried out to the input unit with respect to the display content of the second display unit when the document holder is not facing the reading unit.

Thereby, display switches between the first display unit 19 and the second display unit 21 automatically according to whether the surface 5 of the document holder 4 faces the reading surface 16a of the reading unit 16 or not. Therefore, a user does not need to carryout the switching operation of the display unit to be used for input operation. Thus, complicating operations associated with the input operation are not needed to be carried out and the input operation can be carried out more comfortably.

According to an aspect of the preferred embodiments of the present invention, when switching to the process of accepting the operation content carried out to the input unit with respect to the display content of the first display unit from the process of accepting the operation content carried out to the input unit with respect to the display content of the second display unit, the control unit decides a display content of the first display unit of after the switching based on a display content of the second display unit of before the switching.

Thereby, when the display unit which corresponds to the input operation carried out to the input unit 20 is to be switched to the first display unit 19 from the second display unit 21, the display contents of before the switching and of after the switching are related to each other. For example, by making the content of input operation that can be carried out based on the display content of the second display unit 21 of before the switching be similar to the content of input operation that can be carried out based on the display content of the first display unit 19 of after the switching, the content of input operation of before the switching can be continued promptly after switching. Therefore, complicating operations associated with the input operation are not needed to be carried out and the input operation can be carried out more comfortably.

According to an aspect of the preferred embodiments of the present invention, when the control unit is carrying out the process of accepting the operation content carried out to the input unit with respect to the display content of the second display unit, the input unit accepts an input operation of changing a position of an indicator which is displayed in the second display unit, and when switching to the process of accepting the operation content carried out to the input unit with respect to the display content of the first display unit from the process of accepting the operation content carried out to the input unit with respect to the display content of the second display unit, the control unit decides the display content of the first display unit of after the switching based on the position of the indicator which is displayed in the second display unit.

Because the position of the indicator in the second display unit 21 is decided based on the input operation carried out by a user, it is presumed that the display content corresponding to the position where the indicator is placed is highly related to the content of input operation carried out by a user. Therefore, by deciding the display content of the first display unit 19 of after the switching based on the position of the indicator in the second display unit 21 of before the switching, the content of input operation that can be carried out based on the display content of the second display unit 21 of before the switching can be made to be similar to the content of input operation that can be carried out based on the display content of the first display unit 19 of after the switching. Thus, the content of the input operation of before the switching can be continued after the switching promptly. Further, complicating operations associated with the input operation are not needed to be carried out and the input operation can be carried out more comfortably.

According to an aspect of the preferred embodiments of the present invention, when switching to the process of accepting the operation content carried out to the input unit with respect to the display content of the second display unit from the process of accepting the operation content carried out to the input unit with respect to the display content of the first display unit, the control unit decides a display content of the second display unit of after the switching based on a display content of the first display unit of before the switching.

In such way, when the display unit which corresponds to the input operation carried out to the input unit 20 is to be switched to the second display unit 21 from the first display unit 19, the display contents of before the switching and of after the switching can be related to each other. For example, by making the content of input operation that can be carried out based on the display content of the first display unit 19 of before the switching be similar to the content of input operation that can be carried out based on the display content of the second display unit 21 of after the switching, the content of the input operation of before the switching can be continued after the switching promptly. Thereby, complicated operations associated with input operation are not needed to be carried out and the input operation can be carried out more comfortably.

According to an aspect of the preferred embodiments of the present invention, the image reading apparatus further includes a storage unit which stores correspondence information that makes the display content of the first display unit of before the switching and the display content of the second display unit of after the switching correspond to each other, and the control unit decides the display content of the second display unit of after the switching based on the display content of the first display unit of before the switching and the correspondence information stored in the storage unit.

In such way, the correspondence of the display contents of before the switching and of after the switching can be set in advance. For example, by making the display content of the first display unit 19 of before the switching and the display content of the second display unit 21 of after the switching correspond to each other so that the content of input operation that can be carried out based on the display content of the first display unit 19 of before the switching and the content of input operation that can be carried out based on the display content of the second display unit 21 of after the switching be similar to each other as shown in the example of display content in FIG. 10 and the example of correspondence table in FIG. 11, the content of the input operation of before the switching can be continued of after the switching promptly. Therefore, complicating operations associated with the input operation are not needed to be carried out and the input operation can be carried out more comfortably.

According to an aspect of the preferred embodiments of the present invention, the image reading apparatus further includes a second input display unit including the second display unit and a second input unit which accepts an input operation with respect to the second display unit, a detecting unit which detects a facing state of the document holder with respect to the reading unit and a control unit which switches the second input display unit between a state of operating and a state of not-operating based on the facing state of the document holder detected by the detecting unit.

Thereby, the second input display unit 120 functions as a touch panel. Therefore, input operation with respect to the display content of the second display unit 120*a* can be carried out in a similar feeling as carrying out input operation to the conventional touch panel. In addition, the second display unit 120*a* can include more information in one display content by having a large display screen comparing to the first display unit 119*a*. Therefore, options in the content of input operation with respect to the display content increases and the input operation with respect to the display content can be carried out comfortably.

Moreover, because the first input display unit 119 is included, information display and input accepting in the first input display unit 119 can be carried out when information display and input accepting by using the second input display unit 120 cannot be carried out due to the surface 5 of the document holder 4 facing the reading surface 16*a* of the reading unit 16 such as when a document is being sandwiched by the document holder 4 and the reading unit 16.

According to an aspect of the preferred embodiments of the present invention, the control unit makes the second input display unit be in the not-operating state when the document holder is facing the reading unit and the control unit makes the second input display unit be in the operating state when the document holder is not facing the reading unit.

In such way, the operating state and the not-operating state of the second input display unit 120 is switched automatically according to whether the surface 5 of the document holder 4 faces the reading surface 16*a* of the reading unit 16 or not. Therefore, a user does not need to carry out the switching operation between the operating state and the not-operating state of the second input display unit 120. Thus, complicating operations associated with the input operation do not need to be carried out and the input operation can be carried out comfortably.

According to an aspect of the preferred embodiments of the present invention, the control unit decides a display content of the second display unit based on a display content of the first display unit when the second input display unit is in the operating state.

In such way, the information display and accepting of input operation using the first input display unit 119 can be made to be associated with the information display and accepting of input operation using the second input display unit 120. Therefore, a user can carry out the information display and the input operation anytime by using an arbitrary input display unit. Further, after accepting of the information display and the input operation using the first input display unit 119 is started, when the second input display unit 120 operates due to the document holder 4 being opened, the content of the information display and accepting of the input operation by using the first input display unit 119 can be taken over by the second input display unit 120 by deciding the display content of the second display unit 120*a* based on the first display unit 119*a*. Therefore, switching to the information display and accepting of the input operation by the second input display unit 120 from the information display and accepting of the input operation by the first input display unit 119 can be carried out promptly.

According to an aspect of the preferred embodiments of the present invention, the image reading apparatus further includes a storage unit which stores correspondence information which makes the display content of the first display unit and the display content of the second display unit correspond to each other, and the control unit decides the display content of the second display unit based on the correspondence information and the display content of the first display unit when the second input display unit is in the operating state.

In such way, the correspondence between the display content of the first display unit 119*a* and the display content of the second display unit 120*a* can be set in advance. For example, by making the display content of the first display unit 119*a* and the display content of the second display unit 120*a* correspond to each other so that the content of the input operation that can be carried out based on the display content of the first display unit 119*a* and the content of the input operation that can be carried out based on the display content of the second display unit 120*a* be similar, the information display and acceptance of the input operation by the first input display unit 119 and the information display and acceptance of the input operation by the second input display unit 120 can be associated to each other. Therefore, a user can carry out information display and input operation any time by using an arbitrary input display unit.

According to an aspect of the preferred embodiments of the present invention, the second display unit has a display area which is larger comparing to a display area of the first display unit, and the correspondence information makes one or a plurality of display contents to be displayed in the first display unit and one display content to be displayed in the second display unit correspond to each other.

In such way, the contents corresponding to the plurality of display contents to be displayed in the first display unit 119*a* can be included in one display content which is to be displayed in the second display unit 120*a* having a large display area comparing to the first display unit 119*a*. Therefore, more information can be displayed in one display content to be displayed by the second display unit 120*a*. In addition, options in the content of input operation with respect to the display content of the second input display unit 120 ban be increased and the input operation with respect to the display content can be carried out comfortably.

According to an aspect of the preferred embodiments of the present invention, the correspondence information does not make a predetermined display content to be displayed in the first display unit and a display content to be displayed in the second display unit correspond to each other, and the control unit does not carry out a display that corresponds to the predetermined display content to be displayed in the first display unit in the second display unit.

In such way, confidentiality of input of the information based on the predetermined display content can be improved. As for the information display which requires confidentiality, confidentiality of the input of the information using the first display unit 119*a* can be improved by not making the information correspond to the display content of the second display unit 120*a* in the correspondence table.

According to an aspect of the preferred embodiments of the present invention, the control unit displays information which is changed by an input operation carried out to a first input display unit or a second input display unit so as to be discriminable from unchanged information.

In such way, by viewing the display contents of the first display unit 119*a* and the second display unit 120*a*, the information which is changed by the input operation carried out to the first input display unit 119 or the second input display unit 120 can be clearly discriminated from the unchanged information.

The present U.S. patent application claims a priority under the Paris Convention of Japanese Paten Application No. 2010-133532 filed in the Japanese Patent Office on Jun. 11, 2010 and Japanese Paten Application No. 2010-167876 Japanese Patent Application filed on Jul. 27, 2010, which shall be a basis of correction of an incorrect translation.

What is claimed is:

1. An image reading apparatus which reads a document placed on a reading unit, comprising:
   a touch panel which displays information and accepts an input operation to the displayed information;
   a document holder which sandwiches the document with the reading unit;
   a support which supports the document holder so as to rotate so that a facing state of the document holder with respect to the reading unit is switchable;
   a second display unit which includes a surface of the document holder which faces the reading unit and the second display unit carries out a display in the surface; and
   a control unit which switches, by using the touch panel, between a process of accepting an input operation corresponding to a display content displayed in the touch panel and a process of accepting an input operation corresponding to a display content displayed in the second display unit.

2. The image reading apparatus of claim 1, further comprising:
   a detecting unit which detects the facing state of the document holder with respect to the reading unit,
   wherein
   based on the facing state of the document holder detected by the detecting unit, the control unit carries out the process of accepting the input operation performed on the touch panel with respect to the display content of the touch panel when the document holder is facing the reading unit and carries out the process of accepting the input operation performed on the touch panel with respect to the display content of the second display unit when the document holder is not facing the reading unit.

3. The image reading apparatus of claim 1, wherein
   when switching to the process of accepting the input operation performed on the touch panel with respect to the display content of the touch panel from the process of accepting the input operation performed on the touch panel with respect to the display content of the second display unit, the control unit decides a display content of the first display content of the touch panel of after the switching based on a display content of before the switching.

4. The image reading apparatus of claim 3, wherein
   when the control unit is carrying out the process of accepting the input operation performed on the touch panel with respect to the display content of the second display unit, the touch panel accepts an input operation of changing a position of an indicator which is displayed in the second display unit, and
   when switching to the process of accepting the input operation performed on the touch panel with respect to the display content of the touch panel from the process of accepting the input operation performed on the touch panel with respect to the display content of the second display unit, the control unit decides the display content of the touch panel of after the switching based on the position of the indicator which is displayed in the second display unit.

5. The image reading apparatus of claim 1, wherein
   when switching to the process of accepting the input operation performed on the touch panel with respect to the display content of the second display unit from the process of accepting the input operation performed on the touch panel with respect to the display content of the touch panel, the control unit decides a display content of the second display unit of after the switching based on a display content of the touch panel of before the switching.

6. The image reading apparatus of claim 5, further comprising:
   a storage unit which stores correspondence information that makes the display content of the touch panel of before the switching and the display content of the second display unit of after the switching correspond to each other, wherein
   the control unit decides the display content of the second display unit of after the switching based on the display content of the touch panel of before the switching and the correspondence information stored in the storage unit.

7. The image reading apparatus of claim 1, wherein
   when the control unit is carrying out the process of accepting the input operation performed on the touch panel with respect to the display content of the second display unit, the control unit determines whether the input operation is performed on two points in the touch panel and carries out a process of moving the display content of the second display unit or carries out a process of enlarging or reducing the display content of the second display unit when the input operation is performed on the two points in the touch panel.

8. An image reading apparatus which reads a document placed on a reading unit, comprising:
   a first touch panel which displays information and accepts an input operation to the displayed information;
   a document holder which sandwiches the document with the reading unit;

a support which supports the document holder so as to rotate so that a facing state of the document holder with respect to the reading unit is switchable;

a second touch panel which includes a surface of the document holder which faces the reading unit, displays information on the surface and performs an input operation with respect to the information displayed on the surface;

a detecting unit which detects the facing state of the document holder with respect to the reading unit; and a control unit which switches the second touch panel between a state of operating and a state of not-operating based on the facing state of the document holder detected by the detecting unit.

9. The image reading apparatus of claim 8, wherein
the control unit makes the second touch panel be in the not-operating state when the document holder is facing the reading unit and the control unit makes the second touch panel be in the operating state when the document holder is not facing the reading unit.

10. The image reading apparatus of claim 8, wherein
the control unit decides a display content of the second touch panel based on a display content of the first touch panel when the second touch panel is in the operating state.

11. The image reading apparatus of claim 10, further comprising a storage unit which stores correspondence information which makes the display content of the first touch panel and the display content of the second touch panel correspond to each other, wherein
the control unit decides the display content of the second touch panel based on the correspondence information and the display content of the first touch panel when the second touch panel is in the operating state.

12. The image reading apparatus of claim 11, wherein
the second touch panel has a display area which is larger comparing to a display area of the first touch panel, and
the correspondence information makes one or a plurality of display contents to be displayed in the first touch panel and one display content to be displayed in the second touch panel correspond to each other.

13. The image reading apparatus of claim 11, wherein
the correspondence information does not make a predetermined display content to be displayed in the first touch panel and a display content to be displayed in the second touch panel correspond to each other, and
the control unit does not carry out a display that corresponds to the predetermined display content to be displayed in the first touch panel in the second touch panel.

14. The image reading apparatus of claim 8, wherein
the control unit displays information which is changed by an input operation carried out to a first touch panel or a second touch panel so as to be discriminable from unchanged information.

15. The image reading apparatus of claim 8, further comprising a second document holder, separately from the document holder, which does not include a touch panel,
wherein
a reading surface of the reading unit is covered with the document holder and the second document holder, and
the second document holder includes an automatic document reading device.

\* \* \* \* \*